(12) United States Patent
Sotobayashi et al.

(10) Patent No.: US 8,570,153 B2
(45) Date of Patent: Oct. 29, 2013

(54) METALLIC COVER HAVING IC TAG, AND METALLIC CONTAINER

(75) Inventors: Ken Sotobayashi, Yokohama (JP);
Takayuki Kikuchi, Yokohama (JP);
Masayuki Mori, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 439 days.

(21) Appl. No.: 12/736,895

(22) PCT Filed: May 15, 2009

(86) PCT No.: PCT/JP2009/059029
§ 371 (c)(1),
(2), (4) Date: Nov. 19, 2010

(87) PCT Pub. No.: WO2009/142146
PCT Pub. Date: Nov. 26, 2009

(65) Prior Publication Data
US 2011/0102150 A1  May 5, 2011

(30) Foreign Application Priority Data

May 20, 2008 (JP) .................................. 2008-132386
May 20, 2008 (JP) .................................. 2008-132387

(51) Int. Cl.
*H04Q 5/22* (2006.01)

(52) U.S. Cl.
USPC ..... 340/10.1; 340/10.2; 340/10.5; 340/572.1; 340/572.7; 340/572.9; 343/718; 343/752; 343/860; 343/861

(58) Field of Classification Search
USPC .......... 340/572.1–572.9, 10.1–10.5; 343/718, 343/75, 860, 861
See application file for complete search history.

(56) References Cited

U.S. PATENT DOCUMENTS

| | | | |
|---|---|---|---|
| 5,947,256 A * | 9/1999 | Patterson ....................... | 194/209 |
| 2004/0064362 A1 * | 4/2004 | Rosenfeld ....................... | 705/14 |
| 2004/0130494 A1 * | 7/2004 | Fukushima et al. .......... | 343/702 |
| 2008/0111760 A1 * | 5/2008 | Sakama et al. ................ | 343/860 |
| 2009/0179810 A1 | 7/2009 | Kato et al. | |

FOREIGN PATENT DOCUMENTS

| | | |
|---|---|---|
| JP | 2001-188890 | 7/2001 |
| JP | 2002-207980 | 7/2002 |

(Continued)

OTHER PUBLICATIONS

Japan Patent Office, "Office Action for JP 2009-121588", Jun. 18, 2013.

*Primary Examiner* — Tai T Nguyen
*Assistant Examiner* — Ojiako Nwugo
(74) *Attorney, Agent, or Firm* — Manabu Kanesaka

(57) ABSTRACT

An IC tag can be mounted without deteriorating appearance of a container, breakage or the like of the IC tag can be prevented and excellent wireless communication between a reader/writer becomes possible by eliminating influence of the metal container by ensuring a long communication distance to the reader/writer by allowing excellent communication properties to be exhibited even when an existing IC chip is used and mounting an insulated and sealed IC tag on a metallic cover having a low possibility of being brought into contact with other goods and equipment and being hidden by the adjacent metallic containers. The metallic cover is provided with an IC chip (41), which has a pull-tab (33), and an IC tag (40) for the IC chip (41) mounted on the tab (33), an antenna for the IC tab (40) and a matching circuit (50) for matching impedances between the antenna and the IC chip.

15 Claims, 34 Drawing Sheets

(56) References Cited

FOREIGN PATENT DOCUMENTS

| JP | 2003-95265 A | 4/2003 |
| JP | 2003-110338 | 4/2003 |
| JP | 2004-127057 | 4/2004 |
| JP | 2004-164055 | 6/2004 |
| WO | WO2007/097385 | 8/2007 |
| WO | WO2007097385 | * 8/2007 |

* cited by examiner (a)

(b)

(a) 
Return loss (b) 
Return loss (a)

(b)

(a)   (b)

(a)

(b)

(c)

(a)

(b)

(a)

(b)

(a)

(b)

(a) Reactance (b) Return loss (a)

(b)

(a) Reactance (b) Return loss (a)

(b)

(a)

Reactance (b)

Return loss (a) Reactance (b) Return loss (a)

Reactance (b)

Return loss

METALLIC COVER HAVING IC TAG, AND METALLIC CONTAINER

RELATED APPLICATIONS

The present application is National Phase of International Application No. PCT/JP2009/059029 filed May 15, 2009, and claims priorities from Japanese Applications No. 2008-132386 filed May 20, 2008 and No. 2008-132387 filed May 15, 2009, the disclosure of which is hereby incorporated by reference herein in its entirety.

TECHNICAL FIELD

The present invention relates to a metallic cover to be provided in a metallic container such as an aluminum can and a steel can. In particular, the present invention relates to a metallic cover provided with an IC chip for an IC tag for conducting wireless communication between a reader and a writer, and to a metallic container.

BACKGROUND ART

In general, metallic containers such as an aluminum can and a steel can are widely used as containers for carbonated drinks such as beer, cola, and soda pop or fruit-flavored drinks, various types of tea, canned food and various liquid products.

Such various kinds of metallic containers are provided with a character, a bar code, etc. which display predetermined merchandise information, such as a brand name or ingredients of contents, a producer, a producing district, and a best-before date, for example. This kind of merchandise information is shown by being directly printed on the external surface of a metallic container, or is usually printed on a label and the label is stuck to the external surface of a metallic container.

However, as for the label or printing which displays merchandise information etc., it is common that it is displayed small so that the design or the like of a container is not deteriorated. As a result, the area of a display surface or the character displayed, the number of characters, etc. are limited, and as a result, there was a problem that sufficient merchandise information was not displayed.

Moreover, in the case of bar code display, in order to be read by means of a reader, the bar code itself has to be displayed in a planar form on the container surface. Moreover, reading will become impossible due to the presence of crack, dirt, etc., and since the amount of information which can be coded by a bar code is restricted, the bar code had a certain limit as a means to display and recognize merchandise information as in the case of the display in a character.

Under such circumstances, in recent years, as a means to overcome disadvantageous and inconvenience associated with such conventional merchandise information display, as means for displaying necessary and sufficient merchandise information simply and correctly, an IC tag has come to be used.

An IC tag is called a non-contact IC tag, a RFID (Radio Frequency Identification) tag, RF tag, etc., which is a micro communication terminal which seals an IC chip and a radio antenna with a resin, glass, etc., and is formed in the shape of a tag (baggage tag). Predetermined information is recorded in an IC chip, and the tag is then attached to an object. By picking up the thus recorded information by a reading apparatus (reader/writer) through wireless communication, the information recorded on the IC chip is recognized and displayed.

Such an IC tag can record data (several hundreds bits-several kilobits) in the memory of an IC chip. It can record sufficient information etc. and does not contact the reading equipment, there is no fear of getting crack, dirt, etc., and further, since the tag itself can be used without a power source, processing, downsizing and slimming down thereof can be attained depending on an object to which a tag is attached.

By using such IC tag, various information, including various information about goods, for example, the name or weight of goods, net weight, the name of a manufacturer and a seller, the place and date of manufacture, an expiration date for use, a best-before date, etc., becomes recordable by using such an IC tag. Even for various merchandise information which could not be displayed by a conventional character or a bar code, it became possible to display such information by attaching to a product a tag, which was downsized and became thinner.

When such an IC tag is attached to a metallic container such as an aluminum can or a steel can, the IC tag is adversely affected by the conductivity of the metallic container, and, as a result, a problem occurred accurate wireless communication becomes impossible.

When an IC tag is attached to a container, a magnetic flux which is generated by the IC tag is produced in the direction of penetrating a container. For this reason, when a tag is attached to a metallic container, heat loss etc., which is caused by absorption by the metallic container of magnetic waves and electromagnetic waves emitted by an antenna part arise, whereby communication properties of the tag may be deteriorated.

For example, as shown in FIG. 34(*a*), when an IC tag 100 is attached to a metallic container 101, as shown in FIG. 34(*b*), an eddy current is induced on the surface of the metallic container 101 by a magnetic flux emitted by the tag 100. The eddy current cancels the magnetic flux generated by the IC tag 100, and heat loss occurs.

Moreover, the inductance or the like of the antenna coil part of the tag 100 will be changed by the influences of the metallic container 101, whereby the resonance frequency of the resonant circuit of the antenna will also vary.

When a common IC tag which is used widely is attached to a metallic container as it is in this way, a problem arises that a tag malfunctions or wireless communications with a reader-writer cannot be conducted.

Under such circumstances, a proposal was made that, when attaching an IC tag to a metallic container such as an aluminum can or a steel can, the configuration of the IC tag is changed so that it is dedicated to a metallic container, whereby the influence by a metallic container can be avoided (see Patent Documents 1 to 3).

Specifically, as shown in FIG. 35, an IC tag 102 which is dedicated for use in a metallic container which was conventionally proposed has a configuration that a magnetic body (highly permeable magnetic body) 103 and a dielectric body which are formed in sheet form etc. are arranged at the side opposed to the metallic container 101 within the tag. As a result, a magnetic flux emitted by the IC tag 102 is allowed to pass the magnetic body 103, thereby preventing an eddy current from being generated in the metallic container 101.

RELATED ART DOCUMENTS

Patent Documents

Patent Document1 JP-A-2002-207980 (Pages 2-4, FIG. 1)
Patent Document2 JP-A-2004-127057 (Pages 3-4, FIG. 1)
Patent Document3 JP-A-2004-164055 (Pages 4-5, FIG. 1)

SUMMARY OF THE INVENTION

Problems to be Solved by the Invention

However, as compared with a general-purpose IC tag, the size, such as the thickness, of the conventional IC tag for metallic containers, is large. Therefore, when they are attached to the surface of a metallic container, it becomes visibly apparent that the tag is attached. As a result, not only the appearance of a metallic container may be deteriorated, but also it may be broken when it contacts other goods, apparatuses or the like when shipping, displaying or the like of goods. Furthermore, it can be intentionally peeled off, destroyed or the like, the managerial system may be affected adversely.

It is possible to downsize the IC tag so that it becomes visibly less conspicuous. In this case, the distance (range) of wireless communication may be restricted since a required antenna length cannot be ensured or communication properties may be deteriorated by the influence or the like of adjacent metallic containers.

The present invention has been made in order to solve the problems associated with the conventional technology, and an object thereof is to provide a metallic cover provided with an IC tag for metallic containers, such as an aluminum can and a steel can, which can exhibit excellent communication properties even by using existing IC chips and the communication distance between a reader/writer can be kept long by allowing the metallic cover itself to function as the antenna for an IC tag by allowing the IC chip to electrically contact a pull-tab and by providing a matching circuit for matching impedances between the antenna and the IC chip, whereby good communication characteristics can be obtained while downsizing the IC tag.

Moreover, the present invention is aimed at providing a metallic cover suitable for use in metallic containers such as an aluminum can or a steel can which can ensure a long reader/writer communication distance while downsizing the IC tag by allowing the metallic cover itself as an antenna for an IC tag by electrically contacting the IC chip a pull-tab and by forming a pull-tab in a predetermined shape, ensure a required antenna length and avoid adverse influences by a metal on communication properties.

Means for Solving the Problem

In order to solve the above-mentioned problem, the metallic cover provided with an IC tag of the present invention is a metallic cover having a tab, which comprises an IC chip for the IC tag mounted on said tab, an antenna for the IC tag and a matching circuit for matching impedances between the antenna and the IC chip.

According to the metallic cover provided with an IC tag of the present invention with such a configuration, since the impedances of the IC chip and the antenna can be matched by a matching circuit, communication can be conducted without fear of deterioration of the IC tag performance. As a result, the IC tag can ensure long communication distance to the reader/writer.

In particular, the metallic cover provided with an IC tag of the present invention preferably comprises a substrate on which an IC chip is mounted and, on said substrate, a circuit pattern as a matching circuit formed of a conductive metal. Further, it is preferred that said matching circuit have a configuration in which it electrically contacts said tab and said tab which functions as the antenna.

The metallic cover of the present invention having such a configuration has an IC chip and a matching circuit being integrally formed, whereby the IC tag can be downsized.

Further, by electrically connecting the tab constituting the metallic cover and the IC chip through the matching circuit, the tab is allowed to function as an antenna for the IC tag, whereby the tab and the IC chip are integrally formed to constitute the IC tag.

As a result, a metallic cover provided with an IC tag can be formed by only mounting an IC chip on the cover or the like of a metallic container, and as a result, while downsizing the IC chip itself, an antenna length which is required for communication can be ensured by using an antenna formed of a metallic container, whereby problems such as deterioration of communication properties by a metal can be solved.

In addition, by using the tab as an antenna, there is no need to provide an antenna on the side of the tag, whereby the cost for an antenna can be reduced, the tag can be as small as possible, and a small-sized and low-cost IC tag for a metallic container can be realized.

In addition, the metallic cover provided with an IC tag of the present invention is formed in a predetermined shape having an impedance which can obtain a predetermined actual gain as said antenna for the IC tag.

For example, by allowing the circumferential length of the ring part of the tab to be a predetermined length, the structure of the tab is allowed to change, whereby the imaginary number part component of the impedance can be adjusted.

As a result, the antenna actual gain of the tab can be improved, and, in this sense, the communication distance can be prolonged. In addition, the circuit length or the circuit pattern of the matching circuit can be simplified, whereby the IC tag can be downsized easily.

In addition, since matching of impedances is conducted on both of the matching circuit and the tab structure, as compared with the case where matching of impedances is conducted on only one side, it is possible to conduct matching of impedances between the IC chip and the antenna without making the circuit pattern of the impedance circuit and the shape of the tab complicated. As a result, the production cost can be reduced.

In addition, the metallic cover provided with an IC tag of the present invention is provided with a cover panel to which said tab is fixed, and between the front side edge of said tab and the inner diameter of said cover panel, said tab is formed in such a shape that a space which is large enough for fingers to be inserted is shaped.

With the metallic cover having such a configuration, opening and closing of a can can be conducted without being interfered by the tab itself.

The metallic cover provided with an IC tag of the present invention has a configuration in which said tab electrically contacts said cover panel, whereby said tab and said cover panel function as an antenna.

The metallic cover with such a configuration can constitute a metallic container provided with an IC tag only by mounting an IC chip, and a sufficient antenna length which is required for communication can be ensured by an antenna formed of a metallic cover while downsizing an IC tag main body, whereby problems such as deterioration of communication properties by a metal can be solved.

Further, said metallic cover provided with an IC tag of the present invention is provided with one or two or more projections which project towards said tab and contact said tab.

The metallic cover having such a configuration can adjust the length of electric current which flows through the tab due to the provision of protrusions.

That is, by providing projections in different positions or numbers, the current length is changed and the impedance of the tab is allowed to be adequate, whereby communication in a desired communication frequency band can be conducted more easily.

The metallic cover provided with an IC tag of the present invention is a metallic cover having a tab, and is provided with an IC chip for an IC tag which is mounted on said tab and electrically contacts said tab. Said tab is formed in a predetermined shape such that said tab can have impedance with which an actual gain as an antenna can be obtained.

According to the metallic cover provided with an IC tag of the present invention having such a configuration, by electrically connecting a metal element constituting the metallic cover with an IC chip, the metal element is allowed to function as the antenna for an IC tag, whereby an IC chip and the metal element are integrally formed to constitute an IC tag.

By forming the pull-tab which functions as the antenna for an IC tag into a predetermined shape by increasing the circumferential length of the ring part thereof, the real number part component and the imaginary number part component of an impedance are set to a predetermined optimum value according to the tab shape thereof, thereby to allow the signal transfer properties between the IC chip and the tab as the antenna to be good. As a result, the pull-tab can be allowed to be an antenna having a predetermined actual gain.

With the above configuration, as compared with the case where an IC chip is mounted as it is on a conventional metallic container, the communication distance can be significantly increased.

A metallic container provided with an IC tag can be made only by mounting an IC chip on the cover part of the metallic container. As a result, while downsizing the IC tag main body, it becomes possible to ensure sufficient antenna length which is necessary for communication by an antenna formed of the metallic container, whereby problems such as deterioration of communication properties by a metal can be solved.

Further, by using the metallic container as an antenna, no antenna is required to be provided on the tag side, the cost for an antenna can be reduced, and the tag can be downsized as small as possible, whereby a small-sized and inexpensive IC tag for a metallic container can be realized.

In particular, in the metallic cover provided with an IC tag of the present invention, said tab is preferably formed in a predetermined shape that the relationship between the real number part component $\{Re(Zan)\}$ of the impedance (Zan) of said tab and the real number part component $\{Re(Zic)\}$ of the impedance (Zic) of said IC chip satisfies the following formula (1) and the relationship between the imaginary number part component $\{Im(Zan)\}$ of the impedance (Zan) of said tab and the imaginary part number component $\{Im(Zic)\}$ of the impedance of said IC chip (ZiC) satisfies the following relationship (2).

$$Re(Zan)=Re(Zic) \qquad \text{Formula (1)}$$

$$Im(Zan)=-Im(Zic) \qquad \text{Formula (2)}$$

Due to such a configuration, matching of impedances between the IC chip and the tab as the antenna can be conducted. As a result, further more good communication properties can be attained.

Further, in the metallic cover provided with an IC tag of the present invention, it is preferred that said tab be formed in a predetermined shape such that the imaginary number part component $\{Im(Zan)\}$ of the impedance (Zan) of said tab satisfy the following formula (3) in the communication frequency band of an IC tag to be used:

$$0<\{Im(Zan)\} \qquad \text{Formula (3)}$$

Generally, an IC chip for an IC tag is provided with a matching circuit for converting energy of an electrical wave from a reader/writer into direct current components. Since this matching circuit has a reactance component, the imaginary number part component of the impedance thereof tends to be negative.

In the case of the metallic cover according to the present invention can, in the communication frequency band, the sum of the imaginary number part component of an IC chip and the imaginary number part component of the tab as an antenna can be allowed to be close to be "0", whereby a long communication distance can be ensured.

Further, in the metallic cover provided with an IC tag of the present invention, it is preferred that said tab be provided with a ring part and the circumferential length L of said ring part be 28 mm≤L.

With such a configuration, it is possible to conduct impedance matching between the IC tag side and the side of a tag as an antenna, and further, since the actual gain of the antenna can be improved, communication distance is allowed to be long.

Further, the metallic cover provided with an IC tag of the present invention has a cover panel to which said tab is fixed, said tab electrically contacts said cover panel, whereby said tab and said cover panel function as an antenna, and said cover panel is provided with one or two or more protrusions which project toward said tab and contact said tab.

The metallic cover having such a configuration can adjust the length of current flowing in the tab due to the protrusions which contact the tab.

That is, by providing the projections in different places and in different number, the length of current can be adjusted to allow the impedance of the tab to be adequate, whereby communication can be conducted in a desired communication frequency band more easily.

Further, in the metallic cover provided with an IC tag of the present invention, said tab is formed in a shape which can form a space into which fingers can be inserted between the front end edge of said tab and the inner diameter of said cover panel.

With the metallic cover having such a configuration, can opening and closing can be conducted without being interfered by the tab itself.

In the metallic cover provided with an IC tag of the present invention, it is preferred that a matching circuit for matching impedances be provided between said tab and said IC chip.

In the matching circuit of the present invention, it is preferred that the relationship between the real number part component $\{Re(Zma)\}$ of the impedance (Zma) of said matching circuit, the real number part component $\{Re(Zic)\}$ of the impedance (Zic) of an IC chip and the real number part component $\{Re(Zan)\}$ of the impedance (Zan) of said tab satisfy the following relationship in formula (4).

Further, it is more preferred that the relationship between the imaginary number part component $\{Im(Zma)\}$ of the impedance (Zma) of said matching circuit, the imaginary number part component $\{Im(Zic)\}$ of the impedance (Zic) of said IC chip and the imaginary number part component $\{Im$ (Zac)} of the impedance (Zan) of said tab satisfy the following relationship in formula (5).

$$Re(Zma)=Re(Zic)-Re(Zan) \quad \text{Formula (4)}$$

$$Im(Zma)=-Im(Zic)-Im(Zan) \quad \text{Formula (5)}$$

Due to such a configuration, since the metallic cover is provided with a matching circuit which conducts the impedance matching between the IC chip and the tab as an antenna, return loss can be decreased. As a result, this metallic cover and the metallic container can prolong the communication distance.

Further, by using the matching circuit, as compared with the case where matching of impedance is conducted only by the shape of the tab, it becomes possible to conduct impedance matching between the IC chip and the antenna without allowing the shape of the tab to be complicated, whereby the production cost can be reduced.

The metallic container of the present invention is a metallic container which comprises a container main body and a metallic cover to be put on the container main body, in which said metallic cover is the metallic cover according to the present invention.

According to the metallic container with such a configuration, due to the provision of the metallic cover provided with an IC tag according to the present invention, in metallic containers such as an aluminum can and a steel can, good wireless communication between a reader/writer can be conducted without deteriorating the appearance and design of the container, while preventing breakage, dropping or the like of an IC tag.

Further, since the tab has increased its actual gain as the antenna, good communication properties can be exhibited, and as compared with the case where an IC chip is mounted on the existing tab, the communication distance can be significantly increased.

Advantageous Effects of the Invention

According to the present invention, due to the provision of a matching circuit for matching impedances between the antenna and the IC chip, the IC chip and the antenna can conduct matching of impedances by a matching circuit, whereby communication can be conducted without deterioration of an IC tag performance. As a result, the communication distance of the IC tag to a reader/writer can be kept long.

Further, by allowing the IC chip to electrically contact the metallic cover, it is possible to allow the metallic cover itself to function as the antenna of an IC tag, whereby the metallic cover and the IC chip can be integrated to form an IC tag. As a result, the necessary antenna length can be ensured while downsizing the tag main body, the influence of metals on communication properties can be eliminated, the tag becomes less visible so that the appearance of the metallic containers or the like can be kept favorable, and good wireless communication can be conducted between a reader/writer.

Therefore, according to the present invention, it is possible to realize a metallic cover provided with an IC tag which is particularly suitable for use in metallic containers such as an aluminum can or a steel can.

Further, according to the present invention, it is possible to allow the metallic cover itself to function as the antenna of an IC tag, since the pull-tab is formed into a predetermined shape and the IC chip is allowed to electrically contact this tab.

Further, by allowing the pull-tab which functions as the antenna to be formed into a predetermined shape, impedances of an IC chip and the antenna can be matched, whereby a metallic cover with sufficient communication properties can be realized.

With such a configuration, it becomes possible to realize a metallic cover provided with an IC tag which is suitable for metallic containers such as an aluminum can or a steel can in which a necessary antenna length is ensured while downsizing the tag main body and influence of communication properties by metals can be avoided, and as a result, the tag becomes seemingly less visible, and appearance or the like of metallic containers can be kept favorable, whereby good wireless communication can be conducted between the tag and a reader/writer.

BEST MODE FOR CARRYING OUT THE INVENTION

Preferred embodiments of the metallic cover provided with an IC tag and the metallic container provided with this metallic cover according to the present invention will be explained with reference to the drawings.

First Embodiment

The metallic cover provided with an IC tag and the metallic container provided with this metallic cover according to the first embodiment of the present invention will be explained with reference to FIGS. 1 to 9.
(Metallic Container)

Figure 1:
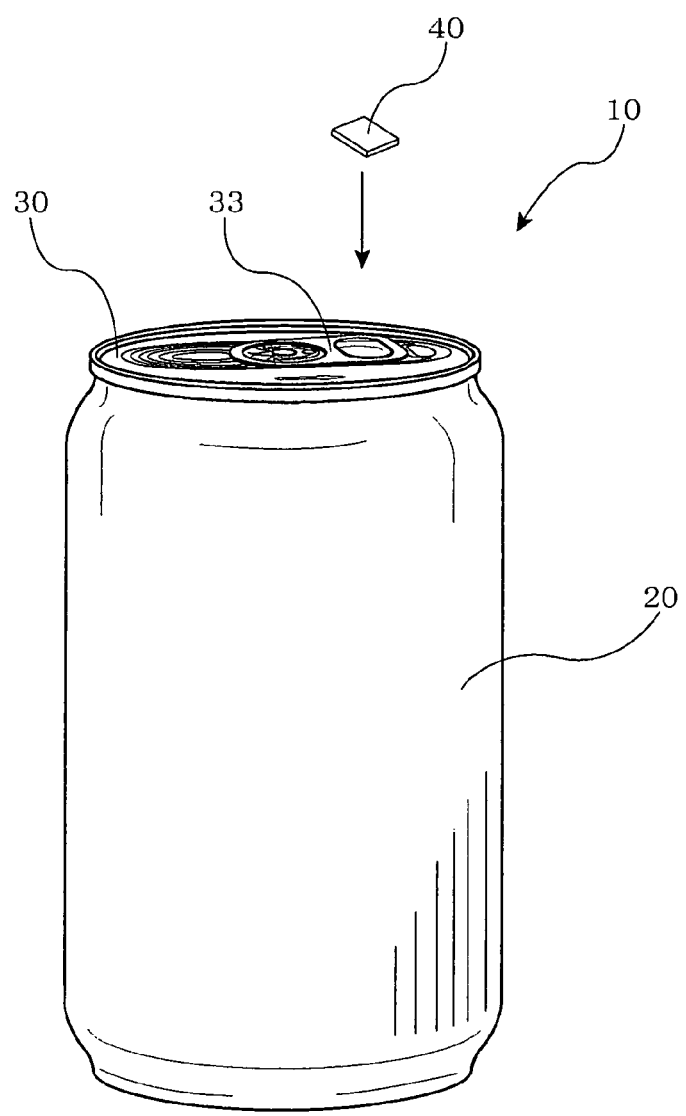
FIG. 1 is a perspective view showing the metallic cover provided with an IC tag and a metallic container provided with the metallic cover according to the first embodiment of the present invention.
Figure 2:
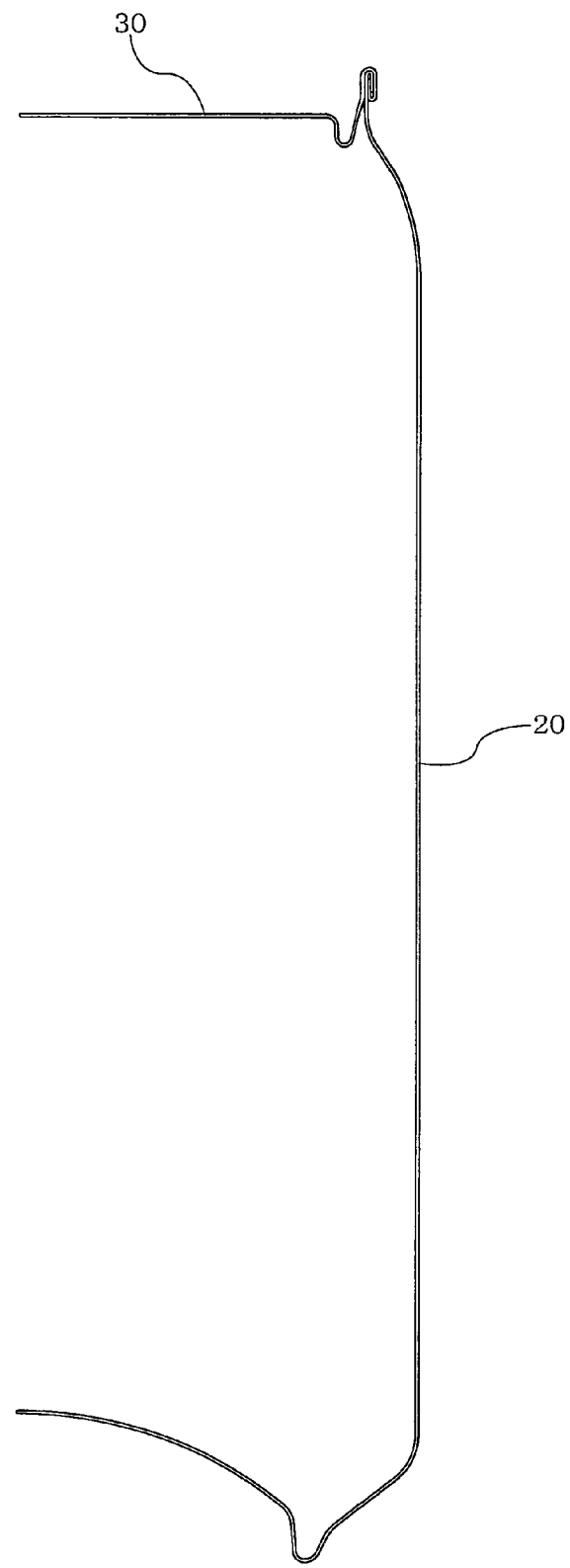
FIG. 2 is a cross-sectional view showing a metallic container's seaming part which constitutes the metallic cover provided with an IC tag and the metallic container provided with this metallic cover according to the first embodiment of the present invention.
Figure 3:
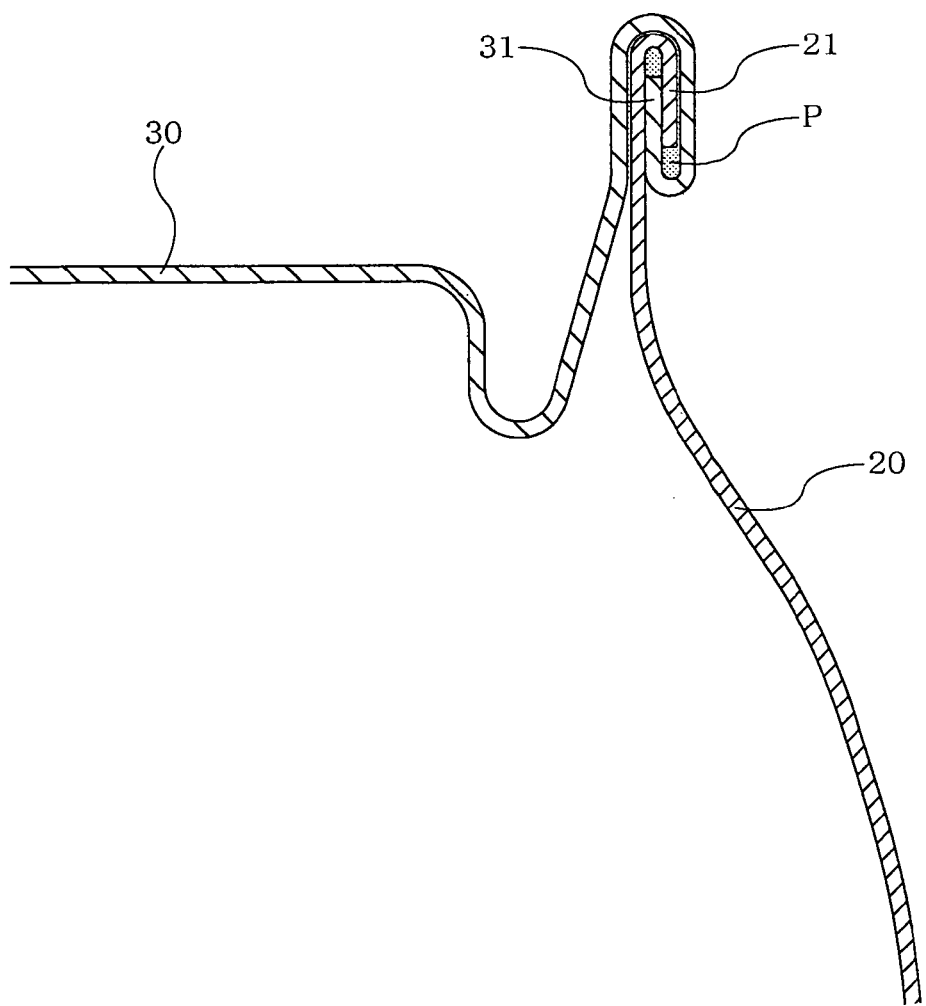
FIG. 3 is a partial cross-sectional view showing the metallic cover provided with an IC tag and the metallic container provided with this metallic cover according to the first embodiment of the present invention.

FIG. 1 is a perspective view showing the metallic container provided with an IC tag according to the first embodiment of the present invention. FIG. 2 is a partial cross-sectional view showing the metallic container according to this embodiment. FIG. 3 is a cross-sectional view showing the seaming part of the metallic container according to this embodiment.

As shown in these figures, the metallic container 10 of this embodiment is a can container such as an aluminum can and a steel can with which drinks are filled, and is formed of a container main body 20 consisting of a trunk part and a bottom part of the can and a metallic cover 30 constituting a cover part of the can.

On the metallic cover 30 of such metallic container 10, an IC tag 40 which conducts communication between a reader/writer is mounted.

As for a can container constituting the metallic container 10, when it is a so-called three-piece can, the trunk part, the cover part and the bottom part are separated, and the can is formed by allowing the cover part and the bottom part to be seamed to the trunk part. If it is a so-called two-piece can, the bottom part and the trunk part are integrally formed to constitute the container main body, and the cover part is seamed to this container main body, thereby to form a two-piece can.

The metallic container 10 of this embodiment is formed of a two-piece can in which the metallic cover 30 constituting the cover part is seamed to the container main body 20 constituting the trunk part and the bottom part.

However, the metallic container 10 may be formed of a three-piece can.

As shown in FIGS. 2 and 3, a part at which the container main body 20 is seamed to the metallic cover 30 is formed by overlapping a body hook 21 formed on the upper end edge of the container main body 20 and a cover hook 31 formed on the outer circumference edge of the metallic cover 30, followed by pressing such that they are seamed.

This seaming part is a part which exerts significantly big influence on keeping the quality of contents filled in the metallic container 10. Normally, the overlapped portion of the seaming part is coated with a urethane resin P or the like to ensure necessary sealing properties.

Due to such a configuration, in the metallic container 10, the container main body 20 and the metallic cover 30 are insulated through a urethane resin P as an insulating member. Strictly, since a part where the container main body 20 and the metallic cover 30 directly contact is present, a perfect insulating state cannot be realized.

Here, as for can containers such as an aluminum can or a steel can, resin-coated can containers obtained by coating a metallic element constituting the container trunk part with a plastic resin such as a PET resin are widely known.

In such resin-coated can containers, the outer surface or the inner surface of the metallic element constituting the container trunk part is coated with a PET resin or the like, the trunk part and the cover part, which are coated with a resin, is originally in a perfectly insulated state irrespective of a urethane resin or the like.

Therefore, by constituting the container main body 20 with such resin-coated can containers and by mounting an IC chip on the cover part of the resin-coated can container, it is possible to allow the cover part which is perfectly insulated from the trunk part to function as an antenna for an IC tag. As a result, without the need of filling of an insulating member to a seaming portion of a can, good communication properties can be obtained in the state where the metallic cover 30 is perfectly insulated from the container main body 20.

Figure 4:
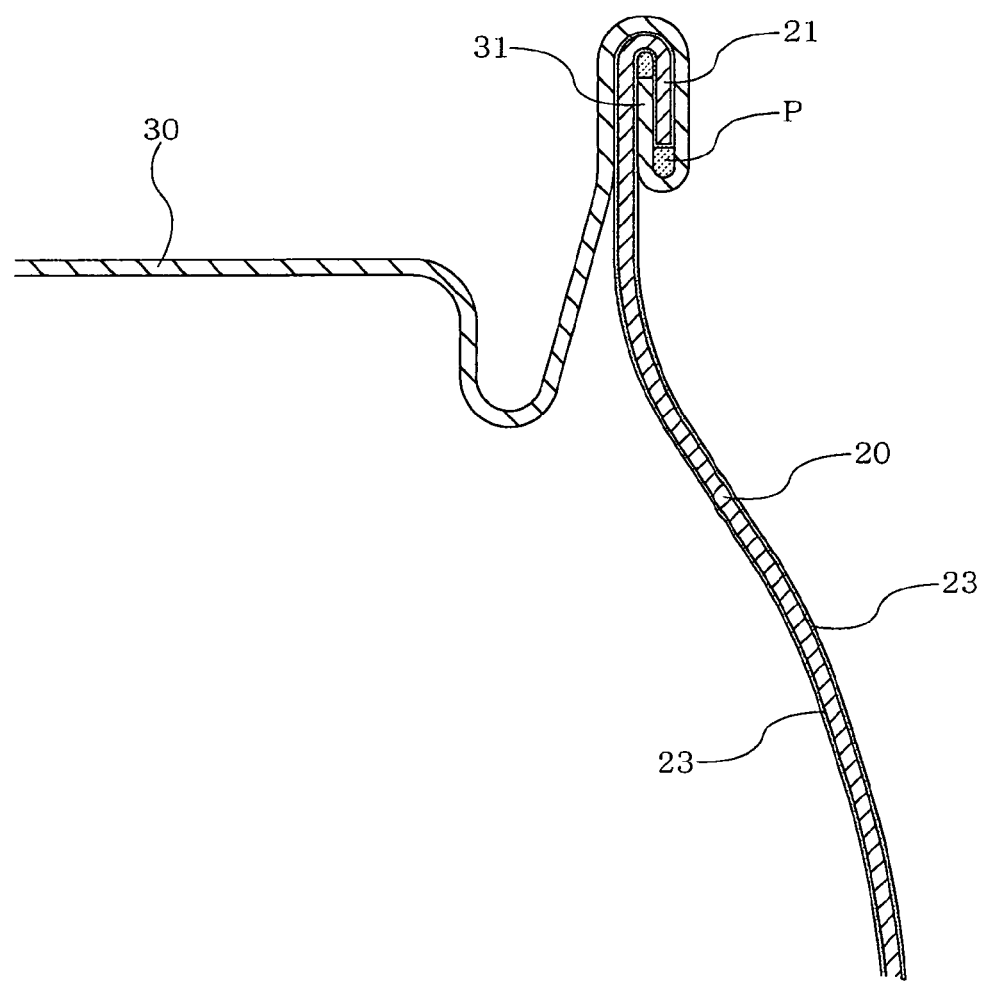
FIG. 4 is a partial cross-sectional view showing the metallic cover provided with an IC tag and the metallic container provided with this metallic cover and coated with a resin according to the first embodiment of the present invention.

FIG. 4 is a partially cross-sectional view showing the metallic container which is coated with a resin in a way as mentioned above.

In the metallic container 10 shown in FIG. 4, the cover part (metallic cover 30) and the trunk part (container main body 20) are insulated by resin coating. With this configuration, good communication properties can be obtained by avoiding the influence exerted from the metals constituting the trunk part.

Specifically, in this embodiment, by constituting the container main body 20 using a resin-coated metal (see resin-coated layers 23, 23), the metallic cover 30 and the container main body 20 are insulated almost perfectly.

The container main body 20 is, for example, formed of a resin-coated metal plate having a thickness of 0.1 to 0.4 mm obtained by laminating a thermoplastic resin film such as a polyester resin film and a polypropylene resin film on both sides of a tin-free steel plate.

As the resin-coated metal plate, for example, one obtained by laminating a polybutylene terephthalate film or a polyethylene terephthalate film with a thickness of 20 μm on the both sides of a metallic thin film such as a 0.18 mm-thick tin-free steel plate.

Examples of the resin to be applied to a metallic thin plate include polyester-based resins, such as polyethylene terephthalate, polybutylene terephthalate, an ethylene terephthalate-isophthalate copolymer, an ethylene terephthalate-adipate copolymer and a butylene terephthalate isophthalate copolymer, polyolefin-based resin such as polyethylene, polypropylene, an ethylene-polypropylene copolymer, an ethylene-acetic acid copolymer and an ionomer, and polyamide-based resins such as Nylon 6 and Nylon 66.

According to the present invention, by providing a matching circuit 50 which will be mentioned later, or by forming a pull-tab 33 of the metallic cover 30 into a predetermined shape, communication of an IC tag (IC chip) can be conducted even when the container main body 20 and the metallic cover 30 are not insulated. In this sense, although it is more preferred that the container main body 20 and the metallic cover 30 be insulated, they need not to be insulated.

Therefore, the configuration of the metallic container 10 may be either one in which the container main body 20 and the metallic cover 30 are intercommunicated (see FIG. 3) and one in which they are insulated (see FIG. 4).
(Metallic Cover)

Figure 5:
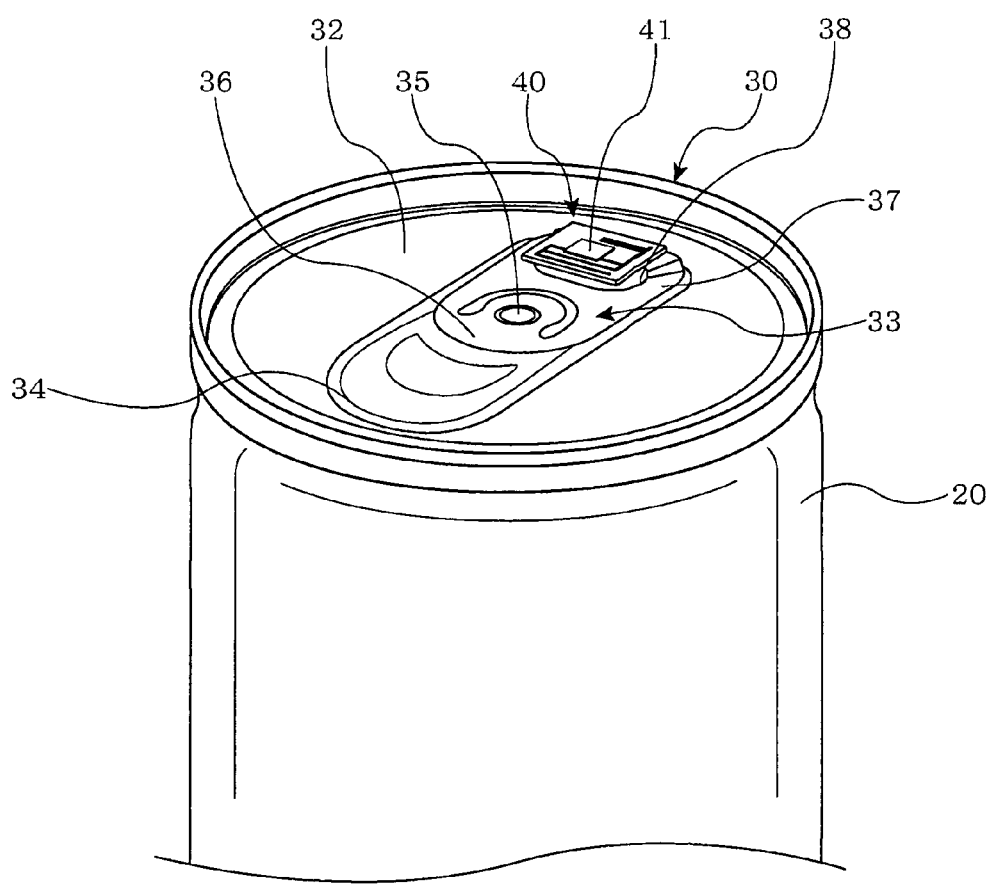
FIG. 5 is a partially-enlarged perspective view showing the metallic cover provided with an IC tag and the metallic container provided with this metallic cover according to the first embodiment of the present invention.
Figure 6:
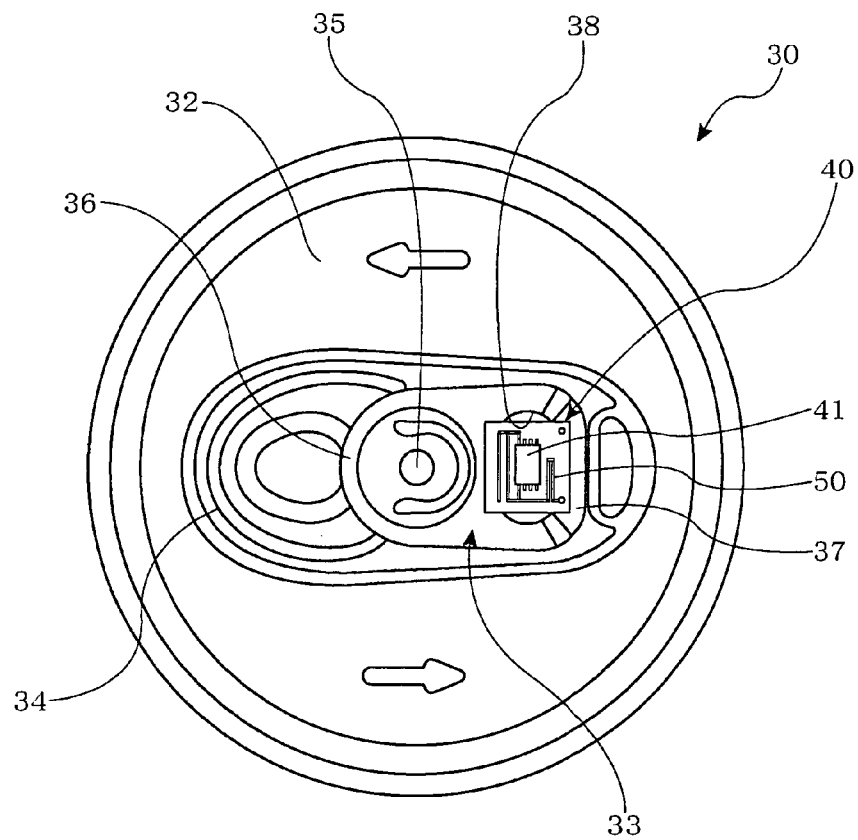
FIG. 6 is a view showing the metallic cover provided with an IC tag and the metallic container provided with this metallic cover according to the first embodiment of the present invention, in which (a) is a plan view and (b) is a cross-sectional side view.
Figure 6:
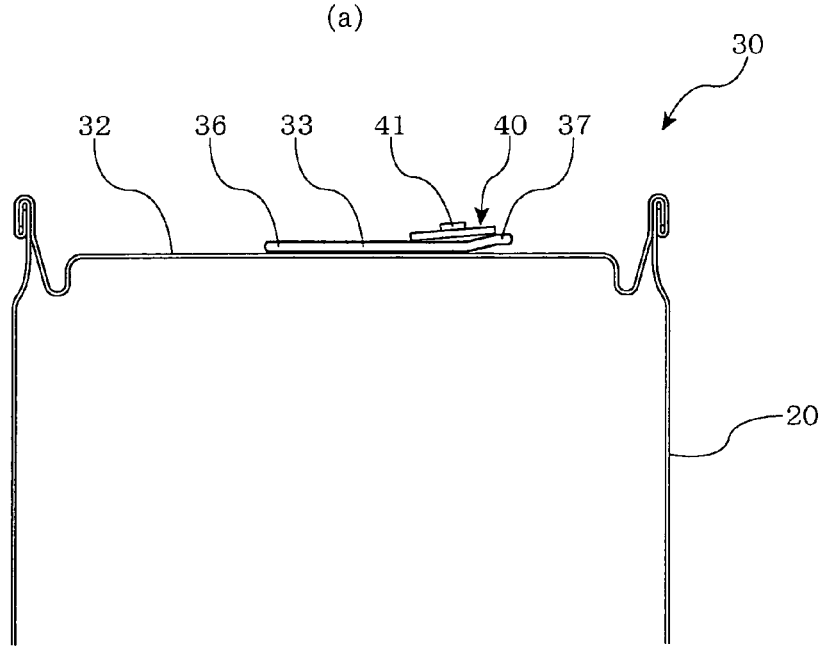

FIG. 5 is a partially enlarged view of the metallic cover provided with an IC tag and the metallic container provided with this metallic cover according to the first embodiment of the present invention. FIG. 6 is a view showing the metallic cover and the metallic container according to this embodiment, in which (a) is a plan view and (b) is a cross-sectional side view.

As shown in these figures, the metallic cover 30 has a configuration in which it is provided with a circular cover panel 32 and a pull-tab 33.

The cover panel 32 is a circular metal plate. In the circumferential edge part thereof, the cover hook 31 as mentioned above is formed. In the offset position in the middle part, a score 34 is formed such that it surrounds a region which will open.

The pull-tab 33 is a rigid element in the form of a metal plate, in which a fixing part 36 to be fixed to the cover panel 32 by a rivet 35 and a ring part 37 extending from the fixing part 36 along the cover panel 32 are integrally provided, and is electrically intercommunicated with the cover panel 32 through the rivet 35.

Further, the tab 33 is formed in such a shape that, between the front end edge of the tab 33 and the inner diameter of the cover panel 32, a space into which fingers can be inserted is formed.

The fixing part 36 is fixed to the cover panel 32 such that it overlaps the region which will open surrounded by the score 34, and the ring part 37 extends in the direction away from the score 34.

The ring part 37 is an annular knob part which has a ring hole 38. When it is raised by putting fingers on the front end of the ring part 37, the front part of the fixing part 36 is lowered with the rivet 35 as a fulcrum, whereby the score 34 is broken according to the so-called principle of a lever. As a result, the region which will open is opened, enabling contents to be poured.

It is preferred that part or all of the ring part 37 be formed such that it is away from the surface of the cover panel 32. In this way, since a finger-putting space is ensured between the ring part 37 and the cover panel 32, fingers can be easily put on the ring part 37 and the ring part 37 can be raised easily.

In this embodiment, an IC tag 40 is provided on the ring hole 38 on the ring part 37 of the pull-tab 33.

The ring hole of the pull-tab is generally recognized as a hole for fingers to be put at the time of opening. The pull-tab in recent years has a structure in which it cannot be separated from a metallic cover after opening. Therefore, it is downsized, and unlike a conventional large-sized pull-tab which is perfectly separated from a container, it has a small ring hole. The pull-tab 33 of this embodiment is a tab which has a small ring hole and is not separated from a metallic cover after opening. As for the ring hole of such pull-tab, fingers are not actually inserted into the ring hole 38, and the ring hole is pressed only by the ball of a finger at the time of opening.

In this embodiment, by mounting an IC tag 40 (IC chip 41) across the ring hole 38 of the ring part 37 of the pull-tab 33, which is an actually dead space, the ring hole 38 can be effectively used as a mounting space.

(IC Tag)

As shown in FIGS. 5 and 6, the IC tag 40 is mounted on the pull-tab 33 of the metallic cover 30.

Generally, an IC tag has an IC chip and an antenna, and has a structure in which the IC chip and the antenna are mounted on a base material formed of a resin or the like. The IC tag 40 according to this embodiment is not provided with a dedicated antenna, and a part of the metallic container 10 is electrically connected to an IC chip 41 for the IC tag, thereby allowing it to function as the antenna of the IC tag 40.

Figure 7:
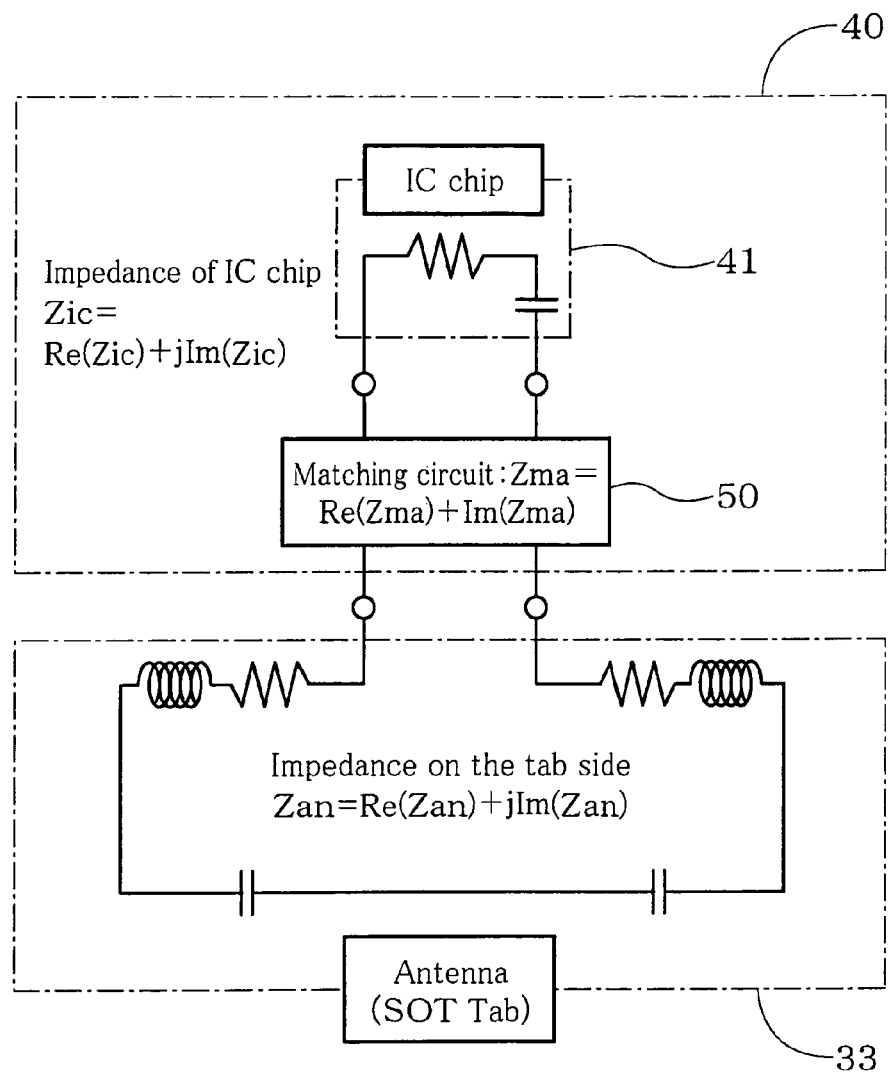
FIG. 7 is an equivalent circuit diagram in the metallic cover provided with an IC tag and the metallic container according to the first embodiment of the present invention.
Figure 8:
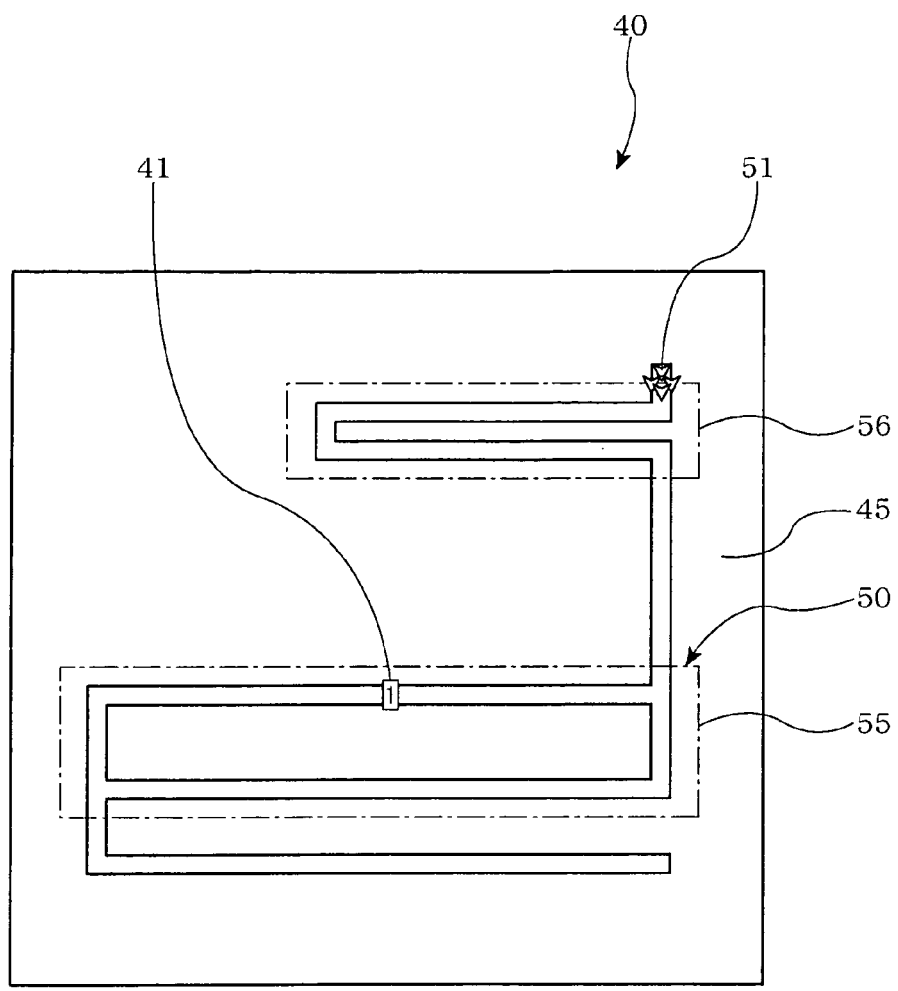
FIG. 8 is a view showing a circuit pattern of an IC tag in the metallic cover provided with an IC tag and the metallic container according to the first embodiment of the present invention and, the metallic container.

Specifically, the IC tag 40 is provided with the IC chip 41 and a matching circuit 50 (see FIGS. 7 and 8). The IC chip 41 is mounted on a square-shaped substrate 45 (see FIG. 8). The matching circuit 50 is formed on the substrate 45 and electrically contacts the IC chip 41 and the tab 33 for matching impedance between the IC chip 41 and the tab 33.

This IC tag 40 is mounted on an opening/closing tag 33 of the metallic cover 30.

The substrate 45 on which the IC chip 41 is mounted is formed of a glass epoxy resin or the like. In the substrate 45, the side of the IC chip 41 and the side of the metallic cover 30 are insulated. The substrate may be formed of a resin film or the like.

The IC chip 41 is formed of a semiconductor chip such as a memory. It can record data of several hundred bits to several kilobits, for example.

Reading and writing (access, registration, delete, update or the like of data) by wireless communication between a reader/writer (not shown) is conducted through an antenna formed of the metallic cover 30, whereby data which has been recorded in the IC chip 41 is recognized.

As the data to be recorded in the IC chip 41, for example, arbitral data such as the identification code, the name, the weight, the amount of contents, the name of a manufacturer/seller, the place of manufacture, the date of manufacture, the expiration date for use or the like, can be recorded. Data rewriting is also possible.

As the frequency band used by IC tag 40, there are several kinds of frequency bands, such as a band of 135 kHz or less, a 13.56-MHz band, an 860M-960 MHz band which belongs to what is called a UHF band, and a 2.45-GHz band, for example. While the communication distance in which wireless communication is possible changes depending on the frequency band used, the circuit pattern such as an optimal antenna length changes depending on the frequency band.

In this embodiment, since the metallic cover 30 is allowed to function as an antenna, by setting the diameter and area of the metallic cover 30 to a predetermined value, it can be an antenna which is suited to a specific frequency band (for example, 2.45 GHz band).

FIG. 7 is an equivalent circuit diagram of the metallic cover provided with an IC tag and the metallic container according to this embodiment of the present invention. FIG. 8 is a view showing a circuit pattern of an IC tag in the metallic cover provided with an IC tag and the metallic container according to the first embodiment of the present invention.

As shown in these figures, the matching circuit 50 is formed of a circuit pattern which is formed, on the substrate 45, of a conductive metal such as aluminum, for example. Then, the matching circuit 50 is provided with a contact part 51 which penetrates the substrate 45 and contacts the tab 33.

This contact part 51 electrically connects the matching circuit 50 and the tab 33.

It suffices that the contact part 51 is electrically connected to the tab 33 in at least one part, and hence, a plurality of contact parts 51 may be provided.

This matching circuit 50 is provided to match, in the transmission path of high-frequency electric signals used in wireless communication, an output impedance of a circuit on the side from which signals are sent and an input impedance of a circuit on the side to which signals are received.

The impedance matching performance is optimized, in the impedance of the IC chip 41, the antenna (tab 33) and the matching circuit 50, when the value of the real number part component of the IC chip 41 coincides with the sum of the real number part component of the antenna and the real number part component of the matching circuit (that is, $\{Re(Zic)\}=\{Re(Zan)\}+\{Re(Zma)\}$) and when the value of the sum of the imaginary number part component of the IC chip 41, the imaginary number part component of the antenna and the imaginary number part component of the matching circuit becomes 0 (that is, $\{Im(Zic)\}+\{Im(Zap)\}+\{Im(Zma)\}=0$).

If these values do not match, the performance of the IC tag 40 is deteriorated.

Consequently, in this embodiment, in a predetermined communication frequency band (2.40 GHz to 2.4835 GHz in this embodiment), the matching circuit 50 is set such that the relationship between the real number part component {Re(Zma)} of the impedance (Zma) of the matching circuit, the real number part component {Re(Zic)} of the impedance (Zic) of the IC chip and the real number part component {Re(Zan)} of the impedance (Zan) of the tab satisfy the following relationship shown by the following formula (4):

$$Re(Zma)=Re(Zic)-Re(Zan) \quad \text{Formula (4)}$$

Further, in a predetermined communication frequency band, the matching circuit 50 is set such that the relationship between the imaginary number part component {Im(Zma)} of the impedance (Zma) of the matching circuit, the imaginary number part component {Im(Zic)} of the impedance (Zic) of the IC chip and the imaginary number part component {Im(Zan)} of the impedance (Zan) of the tab satisfy the following relationship shown by the following formula (5):

$$Im(Zma)=-Im(Zic)-Im(Zan) \quad \text{Formula (5)}$$

This circuit is just one example of the matching circuit, and it may be any circuit as long as it satisfies the above-mentioned formulae (4) and (5).

In this embodiment, in the matching circuit 50, by forming a circuit pattern in a predetermined shape, the real number part component {Re(Zma)} and the imaginary number part component {Im(Zma)} of the impedance thereof (Zma) are allowed to be the above-mentioned predetermined value.

In the IC chip 41, the imaginary number part component {Im(Zic)} of the impedance thereof (Zic) is negative. The reason therefor is that, the IC chip 41 is provided with a rectifier circuit for converting the energy of electric waves from a reader/writer into direct current components and this rectifier circuit has reactance components.

Therefore, in order to match impedances of the IC chip 41 and the tab 33 as an antenna, both the components of the real number part and the imaginary number part are required to be increased.

Then, in this embodiment, the matching circuit 50 is provided with a loop circuit (see numeral 55 in FIG. 8) including a place to which the IC chip 41 is added in order to increase the imaginary number part component {Im(Zma)}. This part 55 contributes to increase the imaginary number part component by imparting inductor components.

Moreover, the matching circuit 50 is provided with a U-shaped part (see numeral 56 in FIG. 8) in order to increase the real part component {Re(Zma)} of impedance (Zma). Since this part 56 prolongs the circuit length, it can increase the value of the real number part component {Re(Zma)} of impedance. Moreover, also in this part 56, adjustment of the value of the imaginary number part component {Im(Zma)} is conducted.

(Communication Properties)

The communication properties of the metallic cover and the metallic container according to the first embodiment of the present invention having the above-mentioned configuration will be explained below.

In the following example, as the IC chip 41, one with an impedance of about Zic=10−j100 is used, and communication was conducted between a reader/writer with a specific small power. The antenna connected to the reader/writer outputs a linear polarized wave of around 6 dBi.

As for the size of the IC tag 40, the length and the width was each about 10 mm and the thickness was about 0.8 mm. As the substrate 45, a substrate with a dielectric constant of 3.9 was used.

Then, this IC tag 40 was attached to a pull-tab of a commercially available steel can (190 ml, the cover has a diameter of about 50 mm).

Figure 9:
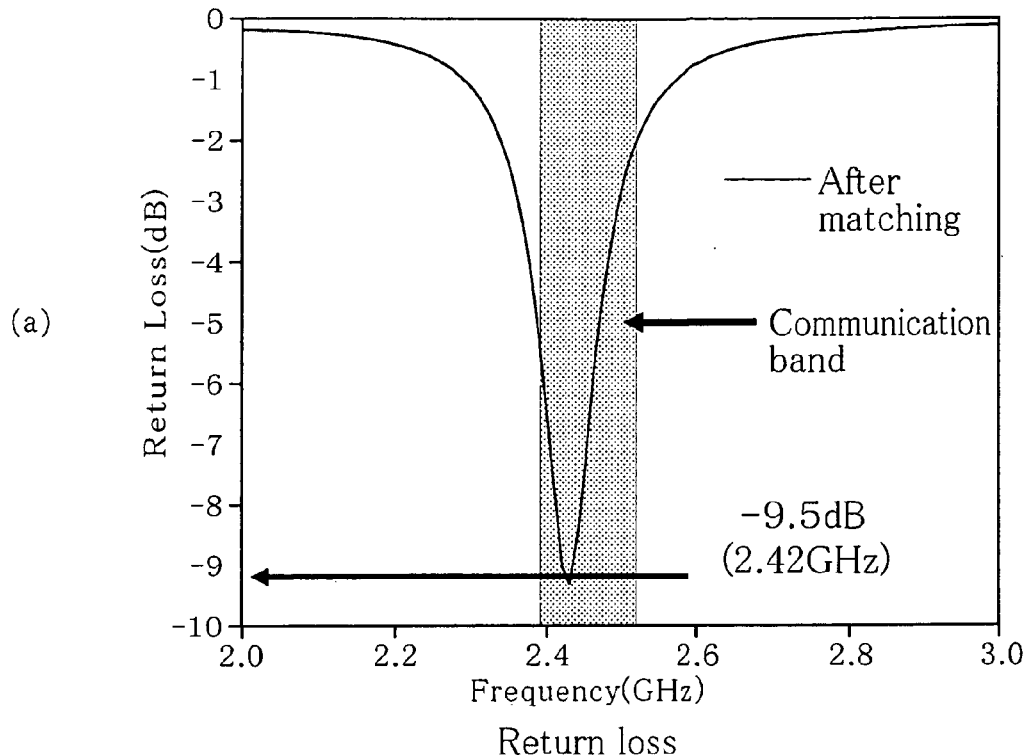
FIG. 9 is a graph showing the relationship between the resonance frequency of an IC tag mounted on the metallic cover and the metallic container and the intensity of wireless signals, in which (a) is a graph relating to the first embodiment of the present invention and (b) is a graph relating to the comparative example.
Figure 9:
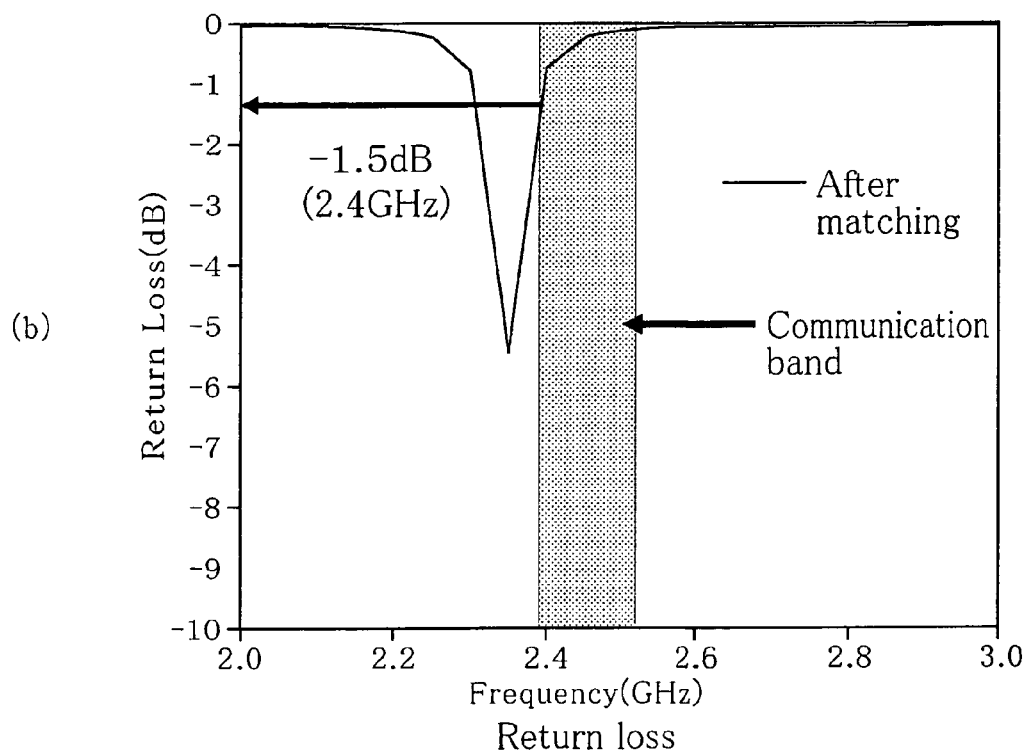

FIG. 9 is a graph showing the relationship between the resonance frequency of an IC tag mounted on the metallic cover and the metallic container and the intensity of wireless signals, in which (a) is a graph relating to the first embodiment of the present invention and (b) is a graph relating to the comparative example.

As shown in FIG. 9(a), in a range of a communication frequency band fb of 2.40 GHz≤fb≤2.4835 GHz, the return loss was about −9.5 dB (communication frequency=2.42 GHz).

The communication distance was 2.0 to 2.5 cm.

As compared with this, when a conventional similar IC tag is attached to the above-mentioned steel can, the maximum performance of the return loss was about −1.5 dB (communication frequency=2.40 GHz) in the communication frequency band (see FIG. 9(b)).

The communication distance of this IC tag was shorter than that having a matching circuit, and reading was impossible unless it contacted a reader antenna. From this, it was confirmed that the matching circuit affects the communication distance.

As mentioned above, according to the metallic cover provided with an IC tag in this embodiment, by electrically connecting the tab 33 of the metallic cover 30 of the metallic container 10 and the IC chip 41 through the matching circuit 50, impedance matching is conducted between the IC chip 41 and the tab 33 as the antenna. As a result, return loss can be reduced.

As a result, when this IC tag 40 is attached to the metallic container 10, as compared with the existing IC tag which is not provided with the matching circuit 50, the communication distance can be significantly prolonged.

In this embodiment, since matching of impedances is conducted by using the matching circuit 50 which is configured independently from the IC chip 41, the existing IC chip can be used as it is by adding the matching circuit 50. That is, when matching of impedances is conducted within the IC chip, design modification such as provision of inductance components in the IC chip has to be conducted, and this design is difficult. Further, if such design modification can be conducted, loss of energy for outputting signals from an antenna is increased, and hence, is not realistic.

Therefore, according to the metallic cover 30 and the metallic container 10 of this embodiment, no design modification or the like of the IC chip becomes necessary, whereby the production cost can be decreased, and an IC chip for the existent general-purpose tag can be used. As a result, an IC tag which is small and inexpensive, excellent in flexibility and extensibility, and can obtain good communication properties at a low cost can be realized.

Further, since the IC chip 41 electrically contacts the tab 33, the metallic cover 30 is allowed to function as an antenna for an IC tag, and the metallic cover 30 and the IC chip 41 are integrally formed into the IC tag 40.

As a result, the metallic container 10 which has a IC tag can be configured only by mounting the IC chip 41 on the cover part of the metallic container 10. An antenna length which is sufficient for communication can be ensured by the antenna formed of the metallic cover 30 while downsizing the IC tag 40 main body, and problems such as deterioration or the like of communication properties by metals can be solved.

Further, by allowing part or all of the metallic container 10 to be an antenna, no antenna is required to be provided on the side nearer to the IC tag 40, and the cost for the antenna can be reduced and the tag can be as small as possible, whereby a small-sized and inexpensive IC tag for metals can be realized.

In this embodiment, the IC tag 40 can be configured only by mounting the IC tag 41 on the metallic cover 30, which becomes seemingly a dead space. Therefore, the IC tag 40 which is formed of the metallic cover 30 is arranged on the upper surface of the metallic container 10, and hence, the appearance of the container is not deteriorated. In addition, even when the metallic containers 10 are stored and displayed, the IC tag 40 has a low possibility of being hidden by other containers or commercial goods or the like, and communication with a reader/writer can be conducted in any state, whereby the tag can sufficiently exhibit the function and properties as an IC tag.

As mentioned above, according to this embodiment, since the IC tag 40 is formed of the cover part of the metallic container 10, the IC tag becomes seemingly less visible. The original appearance and design of the container can be kept without the fear that the appearance of the container is deteriorated by the attachment of the IC tag 40.

In addition, if the IC tag 40 becomes less visible, the IC tag becomes less conspicuous, and as a result, manipulated peeling, breakage or the like of the IC tag 40 can be eliminated.

Further, the metallic container 30 seldom contacts other containers, equipment, goods or the like when the container is stored, shipped, displayed or the like, and as a result, it is possible to effectively prevent the IC chip 41 mounted on the metallic cover 30 from being broken or dropped from the container when it contacts other containers, goods or the like.

Second Embodiment

Subsequently, the metallic cover and the metallic container according to the second embodiment of the present invention will be explained with reference to FIGS. 10 to 14.

Figure 10:
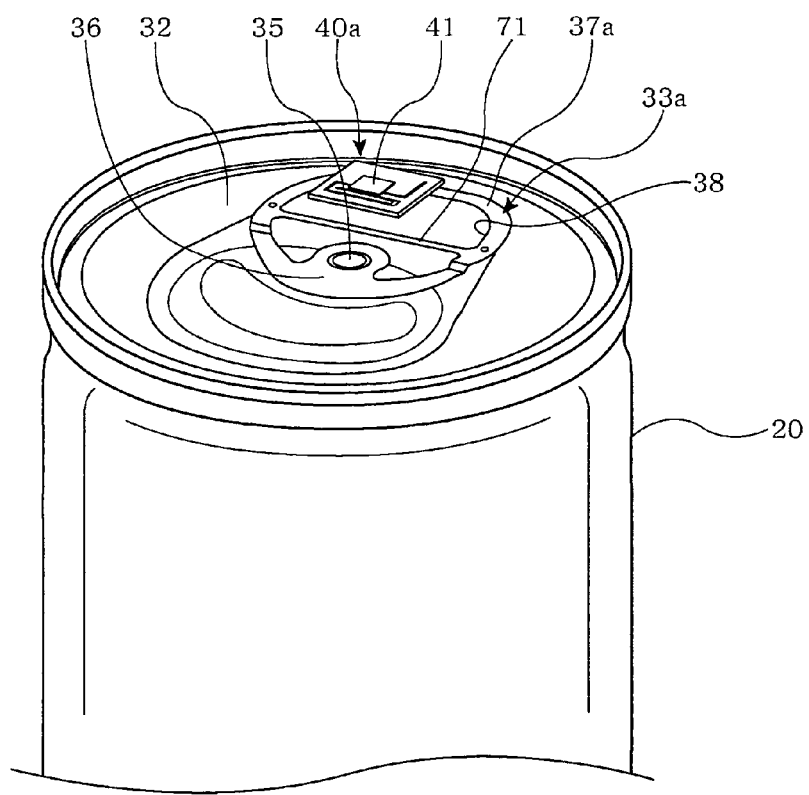
FIG. 10 is a partially-enlarged perspective view of the metallic cover provided with an IC tag and the metallic container provided with this metallic cover according to the second embodiment of the present invention.
Figure 11:
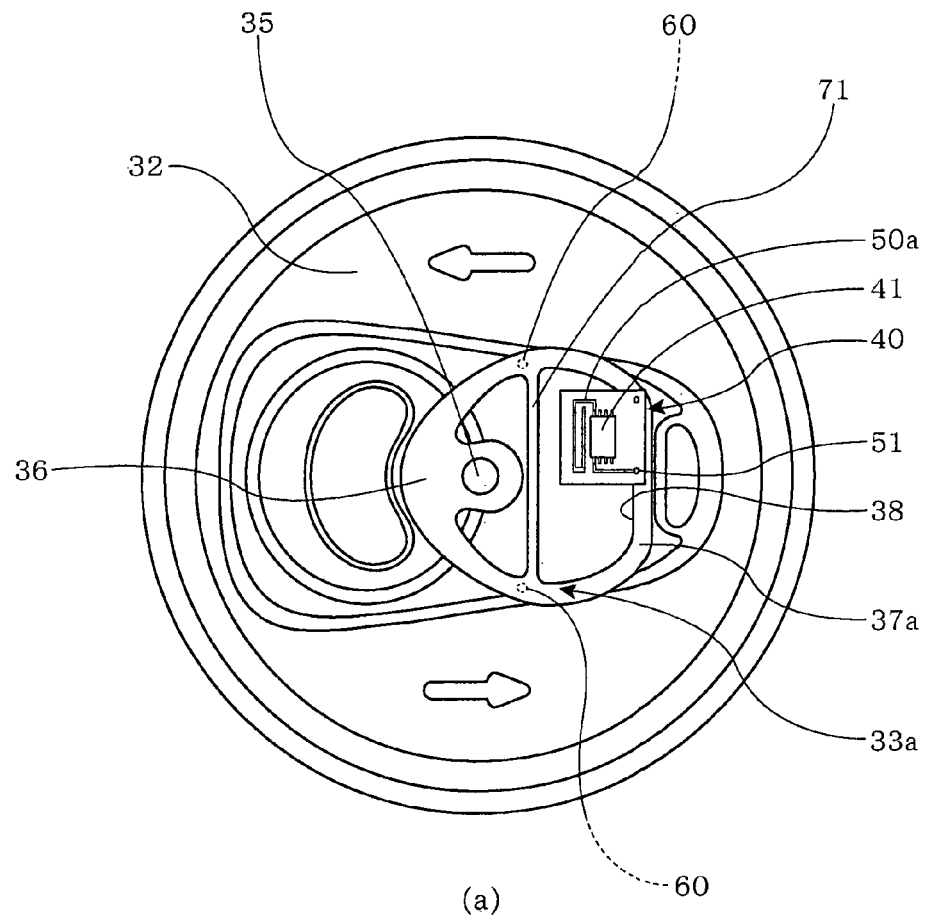
FIG. 11 is a view showing the metallic cover provided with an IC tag and the metallic container provided with this metallic cover according to the second embodiment of the present invention, in which (a) is a plan view and (b) is a cross-sectional side view.
Figure 11:
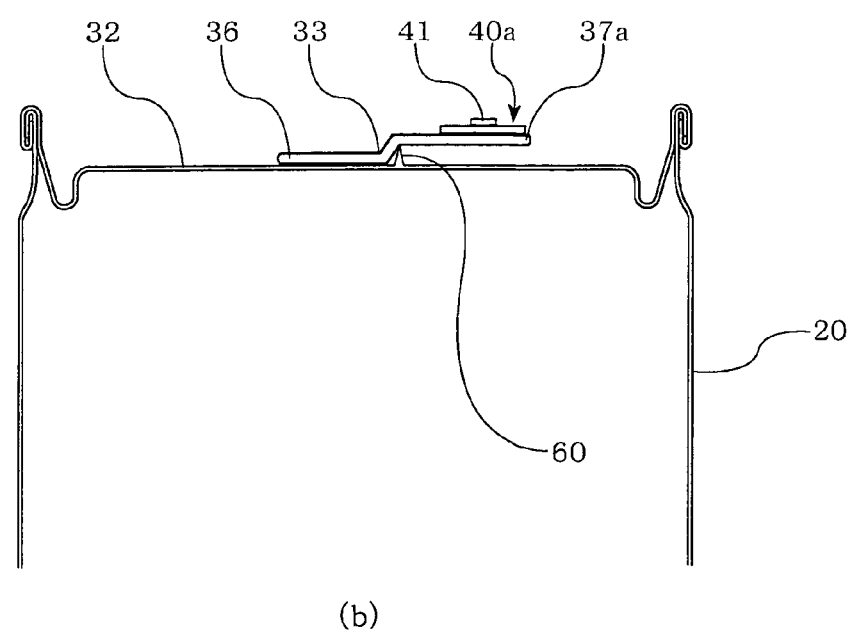

FIG. 10 is a perspective enlarged view showing part of the metallic cover and the metallic container according to this embodiment of the present invention. FIG. 11 is a view showing the metallic cover according to this embodiment, in which (a) is a plan view and (b) is a side cross-sectional view.

Figure 12:
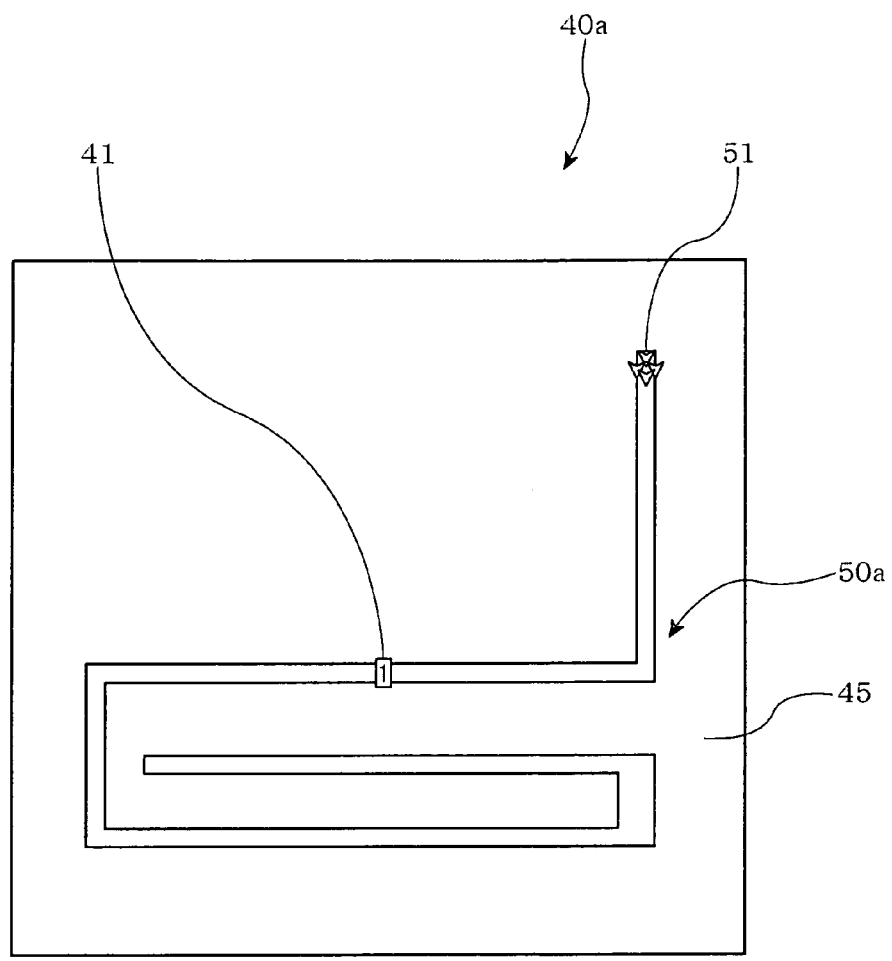
FIG. 12 is a view showing a circuit pattern of an IC tag in the metallic cover provided with an IC tag and the metallic container according to the second embodiment of the present invention.

FIG. 12 is a plan view showing the circuit pattern of the IC tag of the metallic cover according to this embodiment.

As shown in these figures, the shape of the tab 33a of the metallic cover 30 according to this embodiment and the circuit pattern of the matching circuit 50 differ from those in the above-mentioned embodiment.

Tab 33a is formed in the shape of a tab so that a high actual gain as an antenna can be obtained.

Specifically, the ring part 37a of the tab 33a is formed approximately in the shape of a tear drop which has a larger lateral width as compared with that of the first embodiment. And the ring hole 38 is formed largely along the outer contour.

Further, the ring part 37a is provided with an installation bar 71 which crosses the ring hole 38.

Further, the cover panel 32 is provided with two projections 60, which project such that the front end part contacts the ring part 37a, are provided in an almost middle position between the fixing part 35 and the front end part of the ring part 37a.

The projection 60 is formed in about 0.3 mm in this embodiment.

In this way, by providing the projection 60 on the metallic cover 30 and allowing this projection 60 to contact the tab 33a, the length of current flowing in the tab 33a can be adjusted.

By providing the projection part 60 in different places or numbers, the current length can be adjusted, thereby to allow the impedance of the tab 33a to be an adequate value. As a result, communication can be conducted in a desired communication frequency band more easily.

In the front end of the ring part 37a and the hook on the outer circumference edge of the cover panel 32, a space into which fingers can be inserted at the time of opening is formed as in the case of the first embodiment. Further, the rivet part 35 and the fixing part 36 are in the similar mode as in the case of the first embodiment, whereby opening properties can be kept.

As shown in FIG. 12, since no loop part and no U-shaped part is present in the matching circuit 50, and the entire length is short, as compared with the impedance of the matching circuit of the first embodiment, the value of the imaginary number part Im(Zma) is small.

(Communication Properties)

The communication properties of the metallic cover and the metallic container according to the second embodiment of the present invention will be explained below.

In this embodiment, as in the case of the above-mentioned first embodiment, the IC chip 41 having an impedance of about Zic=10−j100, a specific small power reader/writer and an antenna which is to be connected to the reader/writer and outputs a linear polarized wave of an about 6 dBi are used.

Figure 13:
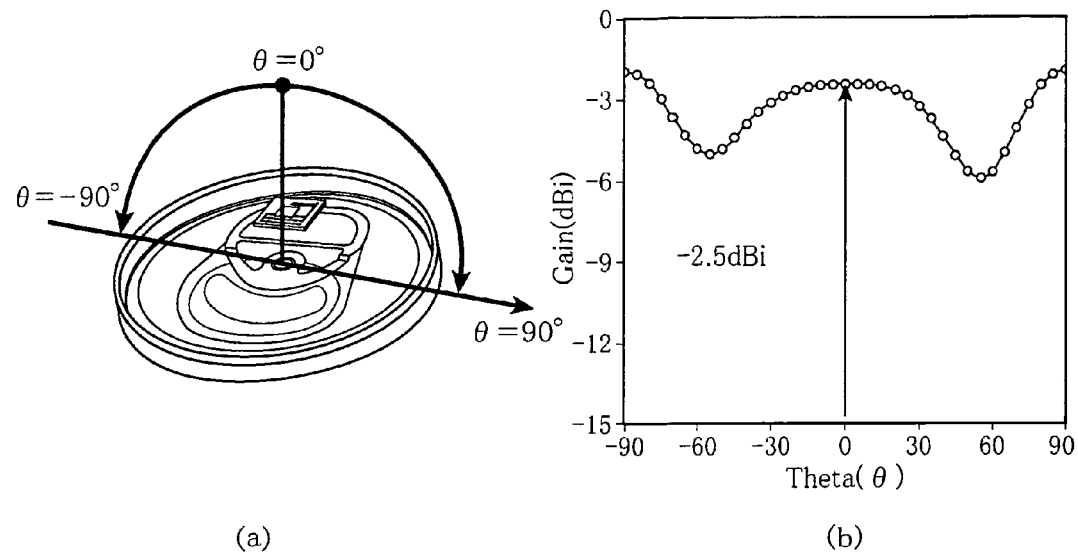
FIG. 13 is a graph showing the relationship between the angle of an IC tag and the antenna gain of wireless signals when the IC tag is mounted on the metallic cover and the metallic container according to the second embodiment of the present invention.
Figure 14:
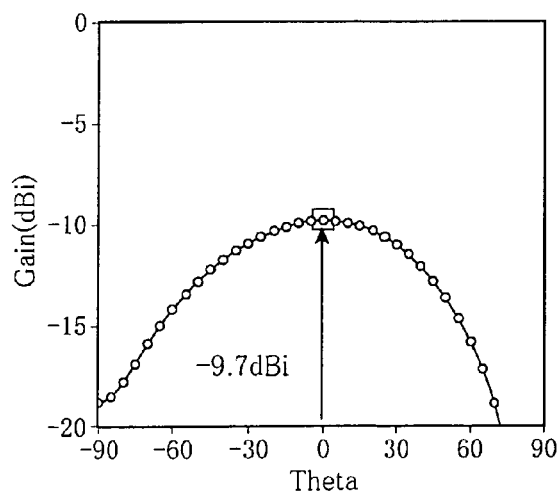
FIG. 14 is a graph showing the relationship between the angle of an IC tag and the antenna gain of wireless signals when the IC tag is mounted on the metallic cover and the metallic container according to the comparative example.

FIG. 13 is a graph showing the relationship between the angle of an IC tag and the antenna gain of wireless signals when the IC tag is mounted on the metallic cover and the metallic container according to the second embodiment of the present invention. FIG. 14 is a graph showing the relationship between the angle of an IC tag and the antenna gain of wireless signals when the IC tag is mounted on the metallic cover and the metallic container according to the comparative example.

The metallic cover 30 of this embodiment had an antenna gain was about −2.5 dBi at a position which is right above the cover (see FIG. 13). In addition, the communication distance of this metallic cover 30 was about 7.0 to 7.5 cm.

In contrast, in the metallic cover and the metallic container obtained by mounting on an existing tab a conventional IC tag which is not provided with the matching circuit 50a according to this embodiment, the antenna gain was −9.7 dBi at a position right above of the middle of the cover panel (see FIG. 14). Further, the communication distance was about several mm of the state when it almost contacts the reader/writer.

As mentioned above, in the metallic cover 30 and the metallic container 10 of this embodiment, by providing a matching circuit 50a and forming the ring part 37a of the tab 33a in a predetermined shape, impedances of the IC chip 41 and the tab 33a as the antenna can be matched, whereby a long communication distance can be ensured.

With such a configuration, the circuit length or the circuit pattern of the matching circuit 50a can be simplified, whereby the IC tag 40 can be downsized easily.

Further, since impedance matching is conducted on both of the matching circuit 50a and the tab 33a, as compared with the case where impedance matching is conducted on either one of the matching circuit 50a or the tab 33a, the impedance matching between the IC chip 41 and the antenna can be conducted without allowing the circuit pattern or the shape of the tab to be complicated. Therefore, the production cost can be decreased.

Third Embodiment

Next, the metallic cover and the metallic container according to the third embodiment of the present invention will be explained with reference to FIGS. 15 to 17.

Figure 15:
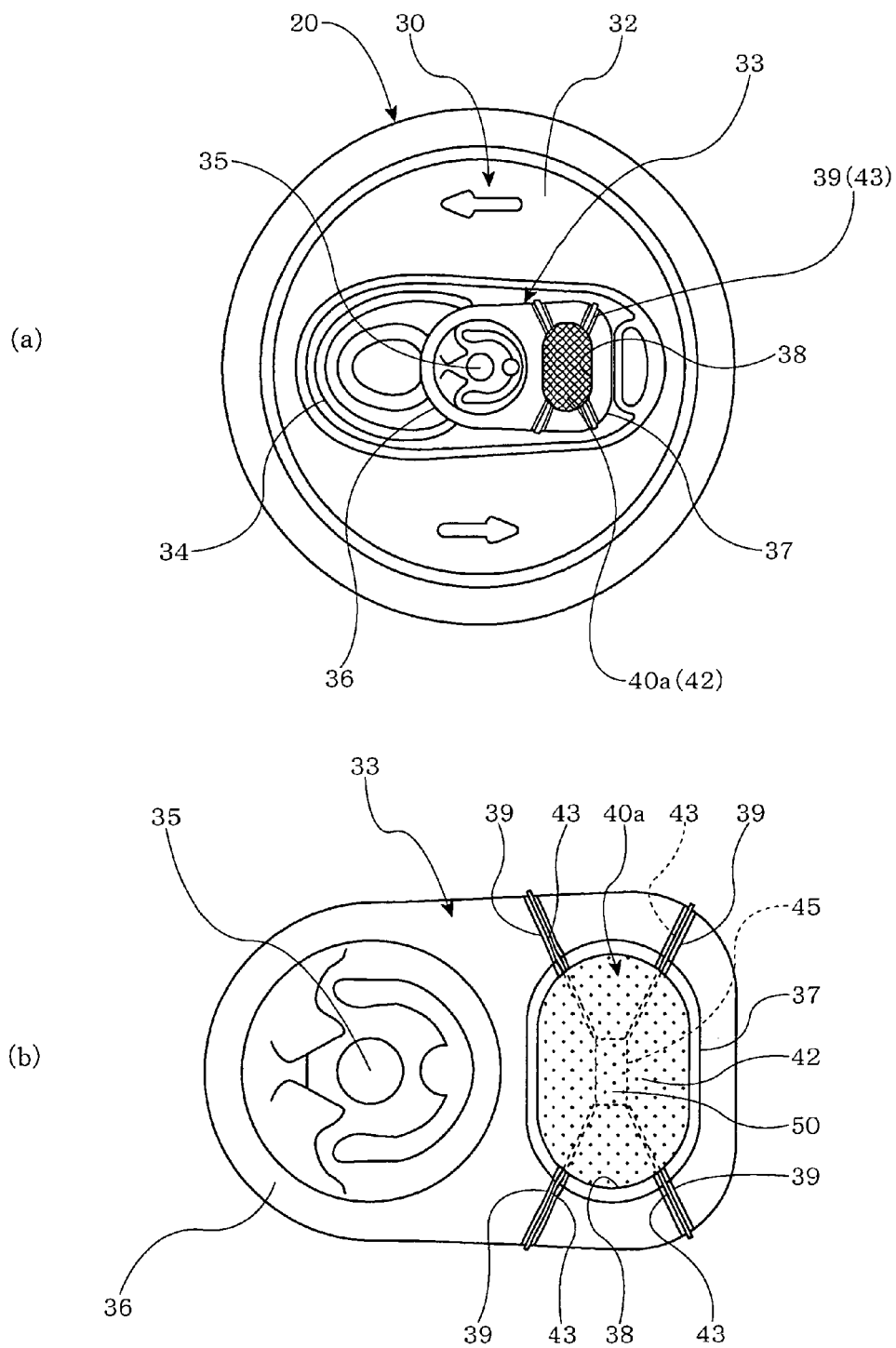
FIG. 15 is a plan view showing the metallic cover provided with an IC tag and the metallic container provided with this metallic cover according to the third embodiment of the present invention.

FIG. 15 is a view showing the metallic cover and the metallic container according to this embodiment, in which (a) is a plan view and (b) is an enlarged plan view of the tab part.

As shown in FIG. 15, the metallic cover and the metallic container according to this embodiment differs from the above-mentioned embodiment in that, the IC tag 40 is inserted into the ring hole 38 of the pull-tab 33 of the metallic cover 30 in the state that the substrate 45 on which the IC chip 41 and the matching circuit 50 are formed is sealed by a sealing element 42.

Specifically, the IC tag 40a is provided with a contact element 43 which protrudes outwardly from the IC chip 41, and the matching circuit 50 and the metallic cover 30 of the metallic container 10 electrically contact and are electrically connected through the contact element 43.

This IC tag 40a is mounted on the pull-tab 33 of the metallic cover 30 in the state that the tag is sealed by the sealing element 42 such as a resin and rubber.

Further, the IC tag 40a has a configuration that it is mounted on the metallic cover 30 when the sealing member 42 which has sealed the IC chip 41 and the matching circuit 50 is pressed into the ring hole 38 of the pull-tab 33 which is to be provided on the metallic cover 30.

The contact element 43 which protrudes from the matching circuit 50 projects outwardly from the sealing member 42 and contacts the pull-tab 33, whereby the IC chip 41 is electrically connected with the metallic cover 30.

Here, in the embodiment shown in FIG. 15, as for the contact element 43, a plurality of (four) wire-like (bar-like) contact elements protrude outwardly from the tag. The shape, number or the like of the contact element 43 is not particularly limited. Further, there is no need that all of the protruding contact elements 43 are electrically connected with the IC chip.

For example, in the example of the wire-like contact member shown in FIG. 15, of the four protruding contact elements 43, it suffices that one or two actually contact the IC depending on the design of an antenna. Other contact elements may serve to fix and support the IC tag 40a without electrically connecting to the IC.

Figure 16:
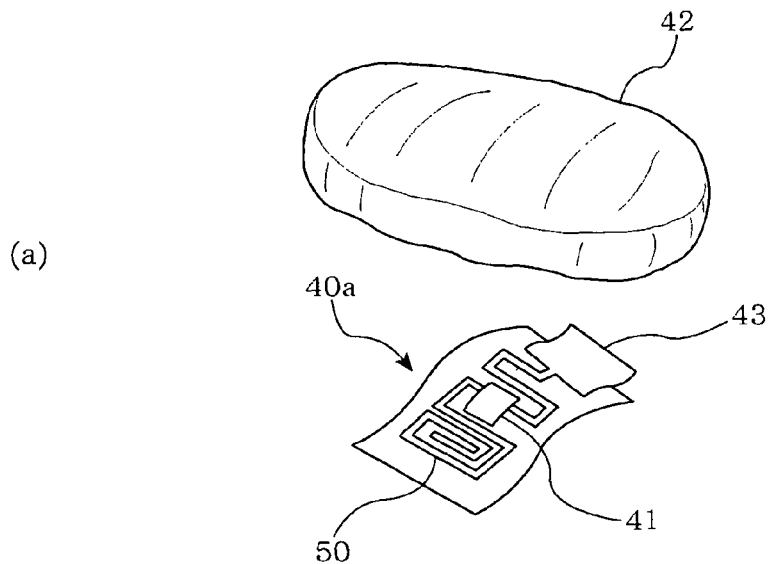
FIG. 16 is a plan view showing the metallic cover provided with an IC tag and the metallic container provided with this metallic cover according to the modification example of the third embodiment of the present invention.
Figure 16:
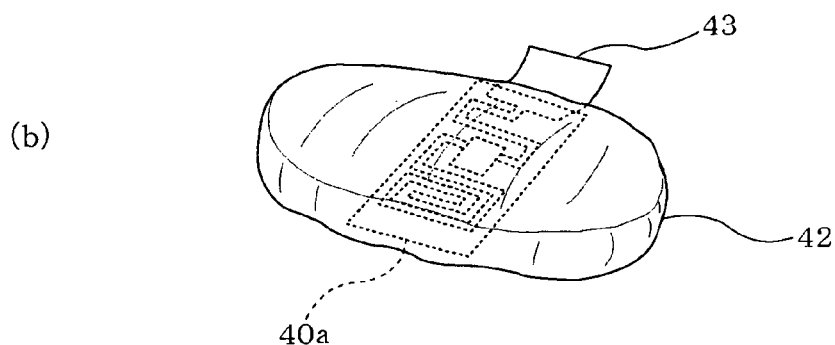
Figure 16:
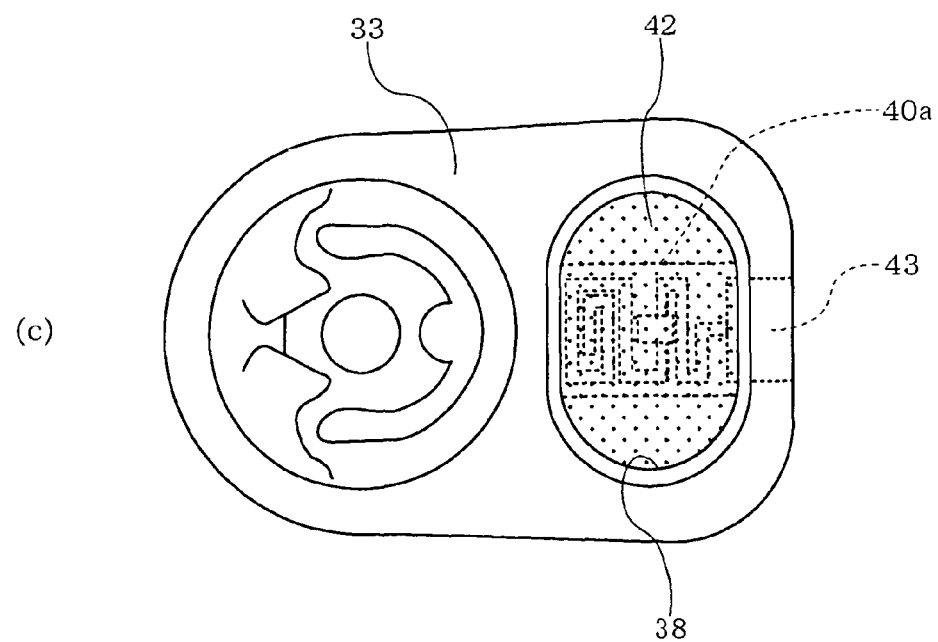

Further, as shown in FIG. 16, which will be given later, the contact element 43 is formed in a plate, a thin film or the like, and is allowed to protrude from the sealing element 42 to allow it to contact and electrically connects to the pull-tab 33.

As for the material of the contact element 43, Cu or Al is suitable. If the contact member 43 is required to be electrically connected to the IC, the contact member 43 is formed of a material having conductivity such as a metal. If the contact member 43 serves to fix the IC with the tab and no electrical connection to the IC is required, the contact member 43 is not required to be formed of a material such as a metal. In this case, any material or element such as a resin can be used as long as it is suitable for supporting and fixing the IC tag 40a.

By mounting the IC chip 41 in the ring hole 38 of the pull-tab 33, the ring hole 38 of the pull-tab 33 can be used as a space where the IC tag is mounted. In addition, the IC chip 41 thus mounted can be protected by the ring part 37 of the pull-tab 33.

As mentioned above, the ring hole of the pull-tab of metal containers which are currently circulating is not large enough to allow fingers to be inserted, and it is configured such that it can be pressed by the ball of a finger at the time of opening. Therefore, in this embodiment, the ring hole 38 of the pull-tab 33 which has been actually a dead space is effectively used as a space for mounting the IC tag 40a, whereby the IC tag is mounted into the ring hole 38 of the pull-tab 33.

With such a configuration, the space of the metallic cover 30 can be effectively utilized without deteriorating the original function of the pull-tab. In addition, it is possible to hide the IC chip within the ring hole 38 to allow the IC chip to be seemingly less conspicuous, and the IC tag can be protected by the ring part 37.

In the embodiment shown in FIG. 15, an engagement groove 39 on which the contact member 43 in the form of a wire which protrudes from the sealing member 42 of the IC tag 40a is engaged is provided on the pull-tab 33. When the contact member 43 is engaged with or contacts this engagement groove 39, the IC chip and the pull-tab 33 are electrically connected.

Specifically, four wire-like contact members 43 radially protrude from the IC tag 40a. Four engagement grooves 39 with which these contact elements 43 can be engaged are formed on the upper surface part of the ring part 37 of the pull-tab 33.

By forming such engagement groove 39 on the pull-tab 33, the contact member 43 can be brought into contact with the pull-tab 33 more surely. As a result, the positioning at the time of mounting the IC chip 41 is facilitated, whereby the operation of connecting the contact member 43 to the pull-tab 33 can be conducted easily.

Further, by allowing the contact member 43 to be engaged with or to contact the groove, the contact member 43 is firmly fixed by the engagement groove 39, whereby poor connection or the like of the contact member 43 can be prevented for a long period of time.

It is preferred that the sealing element 42 for sealing the IC tag 40 be a member having a certain degree of elasticity so that it can be pressed into the ring hole 38 of the pull-tab 33. Examples include rubber materials such as a urethane resin, a polyester resin, a polypropylene resin, a phenol resin, a silicon rubber, SBR or urethane rubber. Further, when a resin is embedded, an isocyanate resin may be mixed as a hardening agent in a urethane resin or a polyester resin.

Sealing of the IC chip 41 and the matching circuit 50 with the sealing member 42 is conducted, for example, by mixing an isocyanate resin as a hardening agent into a urethane resin, flowing the resulting mixture in a mold accommodating a substrate on which the matching circuit 50 and the IC chip 41 are provided, followed by hardening. The substrate may consist of a flexible substrate formed of a resin film. Further, sealing can be conducted in such a manner that exterior materials formed of a resin or rubber are molded in advance so that an IC tag can be mounted, and the IC chip is sealed by being sandwiched between these molded materials or being mounted on these molded materials.

Further, as shown in FIG. 16 mentioned later, the IC chip 41 and the matching circuit 50 are formed on a film-like substrate. By attaching this film-like substrate to the surface of the sealing element 42 which is formed of a resin, rubber or the like, the sealing element 42 and the IC chip 42 (and the matching circuit 50) can be integrally formed.

The sealing element 42 which seals the IC chip 41 as mentioned above is formed such that it is slightly larger than the inner diameter of the ring hole 38 of the above-mentioned pull-tab 33, whereby it can be mounted in the pressed state in the ring hole 38.

As a result, the IC tag 40a which has been sealed with an elastic material such as a resin or rubber can be attached to the metallic cover 30 without the fear of dropping without using a base, an adhesive or the like for mounting, whereby the operation of mounting the IC tag 40a can be conducted quite easily. In addition, the IC tag 40a which is mounted in the pressed state can be removed easily. When used containers are disposed or collected, separation of the container and the IC tag can be conducted easily, whereby a recyclable metallic container can be realized.

Further, the IC tag 40*a* which has been sealed by an elastic member such as rubber can be protected from contact, impact or the like from the outside.

Here, a modification example of the embodiment shown in FIG. 15 is shown in FIG. 16.

As shown in FIG. 16, in this example, at first, the IC chip 41 is mounted on a substrate formed of a film resin or the like formed in the form of a thin film. On the surface of the film-like substrate, a wiring pattern is printed or the like, whereby the matching circuit 50 which is electrically connected with the IC chip 41 is formed.

Further, from one end edge of the film-like substrate, the contact element 43 formed of a metal thin film, which is electrically connected with the wiring pattern of the IC chip 41 and the matching circuit 50, is formed such that it protrudes.

Further, the film-shaped substrate is attached or adhered to the surface of the sealing element 42 which is made of a resin, rubber or the like and is formed such that it can be pressed into the ring hole 38 of the pull-tab, whereby the sealing element 42, the IC chip 41 and the matching circuit 50 are integrally formed.

At this time, the film-like substrate is stacked on and attached to the sealing element 42 such that the surface on which the IC chip 41 is mounted contacts the surface of the sealing element 42. As a result, the IC chip 41 (and the matching circuit 50) is sealed and protected in the state that it is sandwiched between the sealing element 42 and the film-like substrate.

However, the film-like substrate may be stacked on and attached to the sealing element 42 such that the side opposite to the side on which the IC chip 41 is mounted contacts the surface of the sealing element 42. In this case, in order to protect the IC chip 41, the IC chip 41 may be covered by a resin such as an epoxy resin.

Further, the film-like substrate is adhered and fixed to the sealing element 42 after it is positioned such that the thin film-like contact element 43 protruding from the edge part of the substrate projects from one end edge of the sealing element 42 (one end edge of the longitudinal direction of the sealing element 42 in the example shown in FIG. 16).

The film-like substrate and the sealing element 42 can be adhered and fixed by means of an adhesive or the like such that they cannot be peeled. Any method can be used for adhesion.

Due to such a configuration, from the edge part of the sealing member 42 integrated the IC chip 42 and the matching circuit 50, the contact element 43 formed in the form of a thin film which is electrically connected with the matching circuit 50 is allowed to protrude.

The sealing element 42 integrated the IC chip 42 and the matching circuit 50 in the form of a thin film is attached to and pressed into the ring hole 38 from the upper surface or the lower surface of the pull-tab 33 such that the contact member 43 protruding outwardly contacts the pull-tab 33.

In this way, as in the case of the above-mentioned embodiment shown in FIG. 15, the IC tag 40*a* which is protected and sealed by an elastic element such as a resin and rubber, can be attached to the metallic cover 30 in such a manner that it cannot be dropped without using a base material, an adhesive or the like for mounting, whereby the mounting of the IC tag 40*a* can be conducted extremely easily. Further, the IC tag 40*a* which has been sealed by an elastic element such as rubber can be protected from contact, impact or the like from the outside.

Further, with the configuration shown in FIG. 16, since the substrate constituting the IC tag 40*a* is formed of a resin film, it can be downsized and thin as compared with the case of a glass substrate or the like. Further, by forming the contact element 43 for electrical connection with the pull-tab 33 in the form of a thin film, as compared with the case where the wire-shaped contact element 43 is provided, the entire IC tag 40*a* can be further downsized and small in thickness, whereby the production can be facilitated.

As shown in the above-mentioned second embodiment, the shape of the pull-tab 33 or the ring hole 38 can be a predetermined shape taking antenna properties into consideration. In this case, the shape of the sealing element 42 of the IC tag 40*a* or the contact element 43 can be allowed to be a shape which corresponds to the pull-tab 33 or the ring hole 38.

Figure 17:
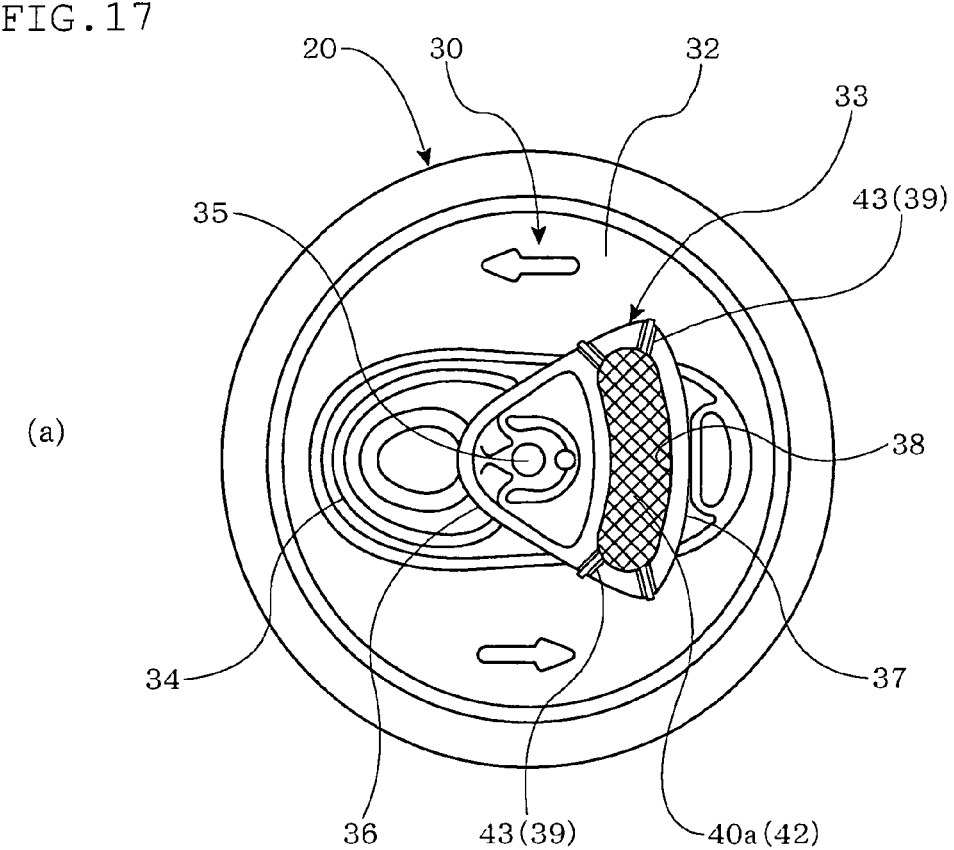
FIG. 17 is a plan view showing the metallic cover provided with an IC tag and the metallic container provided with this metallic cover according to the modification example of the third embodiment of the present invention.
Figure 17:
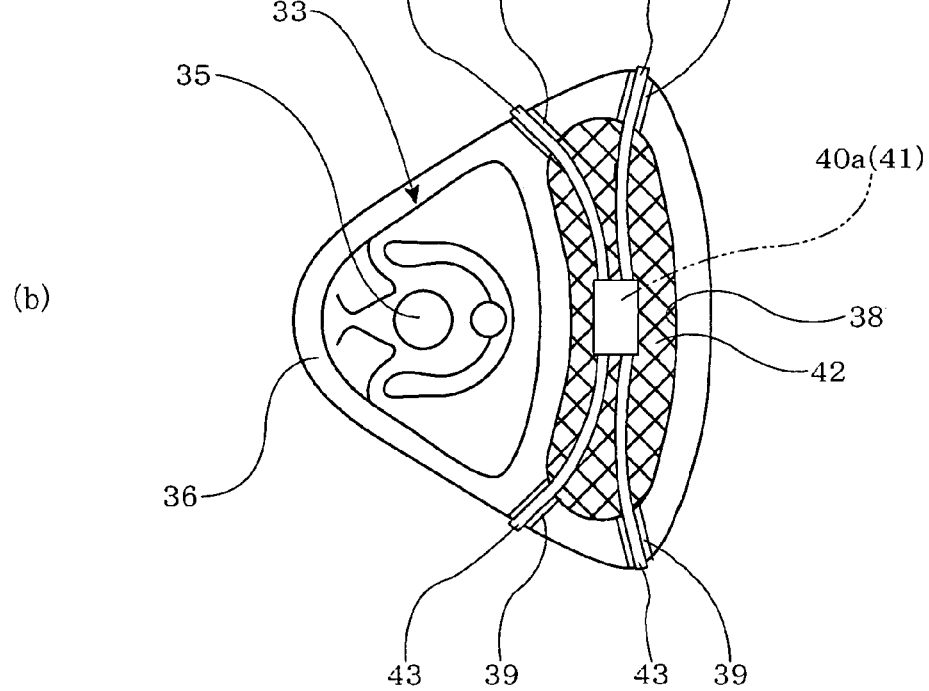

Such modification example is shown in FIG. 17.

In the example shown in FIG. 17, the pull-tab 33 is formed in the shape of a fan, and the ring hole 38 is formed in a larger shape in the horizontal direction. The sealing element 42 of the IC tag 40*a* is formed, corresponding to the shape of the ring hole 38, in a shape such that it can be attached to the ring hole 38 in the pressed state. The four contact elements 43 are formed in a bent shape such that it can abut and be supported by the fan-shaped pull-tab 33.

In this way, the sealing element 42 and the contact element 43 of the IC tag 40*a* can be formed into an arbitral shape in correspondence with the shape and configuration of the pull-tab 33 or the ring hole 38.

Meanwhile, it is needless to say that the modifications corresponding to the shape and configuration of the pull-tab 33 or the ring hole 38 can be applied to the IC tag 40*a* and the sealing element 42 shown in FIG. 16 as given above.

(Method for Mounting an IC Tag)

Next, the method for mounting the IC tag 40*a* on the metallic cover 30 will be explained taking the IC tag 40*a* shown in FIG. 15 as an example. The mounting method shown below can also be applied to the IC tag 40*a* shown in FIG. 16 and FIG. 17.

As mentioned above, in the IC tag 40*a*, the IC chip 41 is covered and sealed in advance by the sealing element 42. The sealing element 42 which has sealed the IC chip 41 has suitable elasticity.

The outer shape of the sealing element 42 which has coated and sealed the IC tag 40*a* corresponds to the shape of the ring hole 38 formed in the pull-tab 33, and is formed slightly larger than the ring hole 38.

Further, from the IC tag 40*a*, the contact element 43, which is electrically connected to the matching circuit, extends into four directions. This contact element 43 penetrates the sealing element 42 and protrudes outwardly.

The IC tag 40*a* which has been sealed in this way is attached to the ring hole 38 of the pull-tab 33 in the pressed state.

The mounting can be easily conducted by, while positioning the contact element 43 which protrudes from the sealing member 42 with the engagement groove 39 of the pull-tab 33, pressing the sealing member 42 having elasticity into the ring hole 38.

When the IC tag 40*a* is mounted, the protruding contact element 43 come up against the ring part 37 and is electrically connected with the pull-tab 33, and is engaged with and supported by the engagement groove 39 formed in the ring part 37.

In the IC tag 40*a* which has been mounted as mentioned above is electrically connected, the pull-tab 33 and the IC chip 41 are electrically connected with the matching circuit 50 through the contact element 43, whereby the metallic cover 30 is allowed to function as the antenna of the IC tag 40*a*.

When the container is disposed or collected after use, by pushing out the sealing element 42 which is attached to the ring hole 38 in the pressed state, the IC tag 40*a* can be removed from the pull-tab 33.

Fourth Embodiment

Next, the metallic cover and the metallic container according to the fourth embodiment of the present invention will be explained with reference to FIG. 18.

Figure 18:
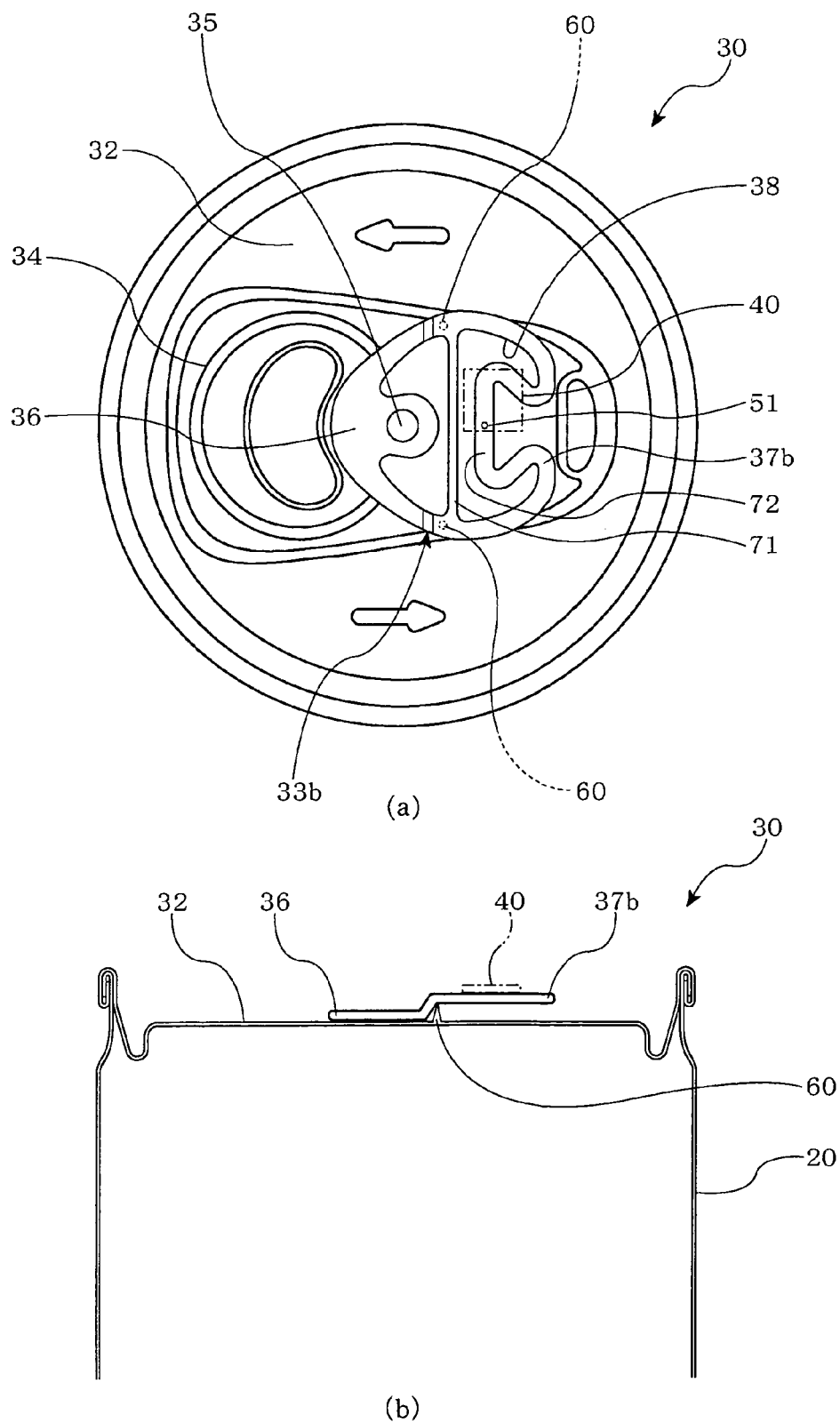
FIG. 18 is a view showing the metallic cover provided with an IC tag and the metallic container provided with this metallic cover according to the fourth embodiment of the present invention, in which (a) is a plan view and (b) is a cross-sectional side view.

FIG. 18 is an enlarged view showing part of the metallic cover and the metallic container according to this embodiment, in which (a) is a plan view and (b) is a side cross-sectional view.

As shown in this figure, the metallic cover 30 according to this embodiment differs from the above-mentioned second embodiment in the shape of the tab 33*b*.

As compared with that in the second embodiment, in the tab 33*b*, in the front part of the ring part 37*b*, a recess part 72 which is formed in almost a triangle shape is formed on the side nearer to the fixing part 36. Other configurations are the same as those of the above-mentioned second embodiment.

Due to such a configuration, since the ring part 37*b* of the tab 33*b* has a larger shape, the real number part component {Re(Zan)} and the imaginary number part component {Im(Zan)} of an impedance (Zan) of the tab as the antenna in the communication frequency band are allowed to be a value larger than a predetermined value.

As a result, the matching circuit can be simplified.

Fifth Embodiment

Next, the metallic cover and the metallic container according to the fifth embodiment of the present invention will be explained with reference to FIG. 19.

Figure 19:
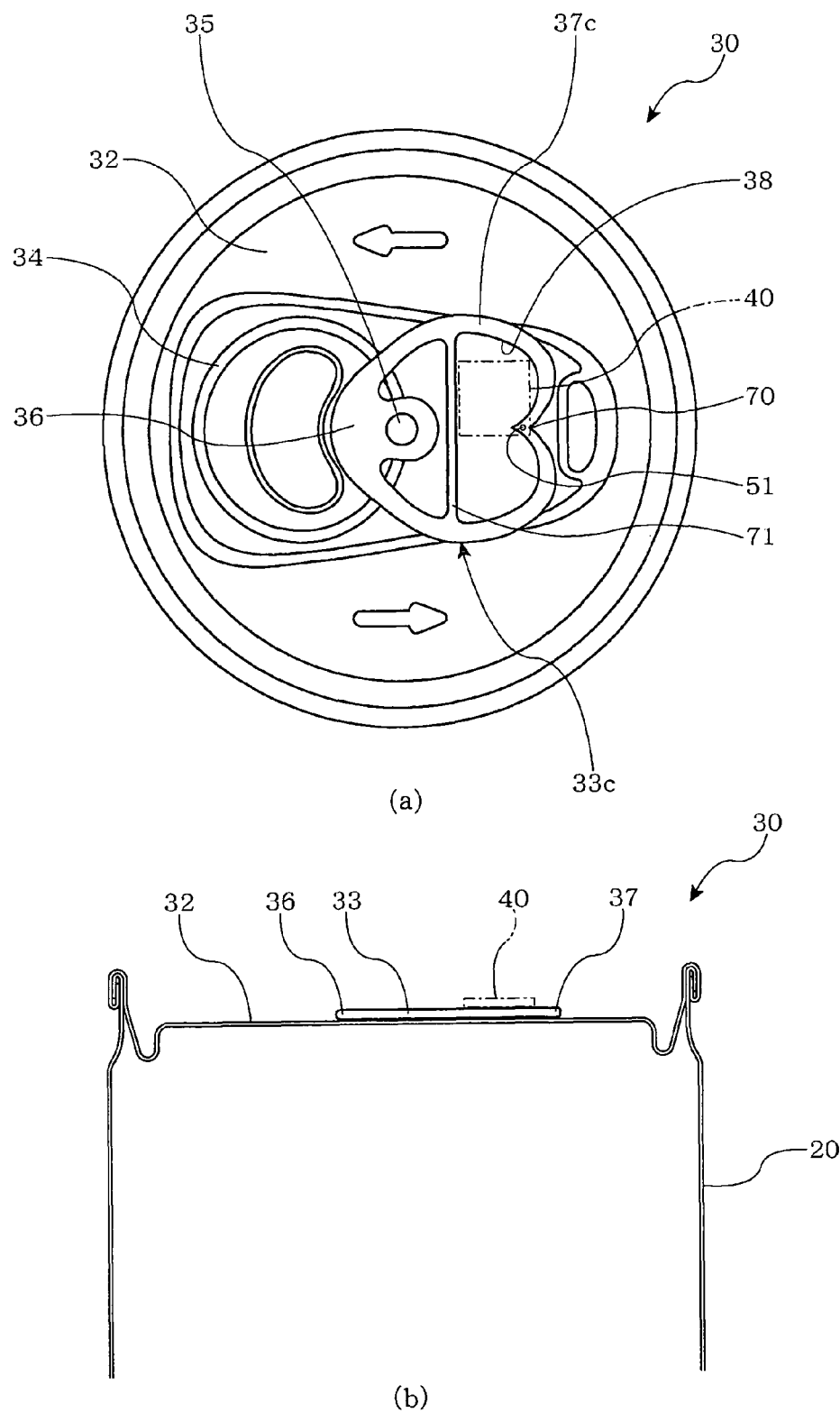
FIG. 19 is a view showing the metallic cover provided with an IC tag and the metallic container provided with this metallic cover according to the fifth embodiment of the present invention, in which (a) is a plan view and (b) is a cross-sectional side view.

FIG. 19 is an enlarged view showing part of the metallic cover and the metallic container according to this embodiment, in which (a) is a plan view and (b) is a side cross-sectional view.

As shown in this figure, the metallic cover 30 according to this embodiment differs from that of the second embodiment in that the tab 33*c* is formed in an almost heart-like shape in which, in the front end part of the ring part 37*c*, a recess part 70 in an almost V-shape is formed toward the fixing part 36.

Due to such a configuration, since the ring part 37*b* of the tab 33*b* has a larger shape, the real number part component {Re(Zan)} and the imaginary number part component {Im(Zan)} of an impedance of an antenna (Zan) in the communication frequency band are allowed to be a value larger than a predetermined value.

As a result, the matching circuit can be simplified.

Other configurations are the same as those in the above-mentioned second embodiment.

Sixth Embodiment

Next, an explanation will be made on the metallic cover provided with an IC tag according to the sixth embodiment of the present invention and the metallic container provided with this metallic cover with reference to FIGS. 20 to 23.

The metallic cover of this embodiment is provided with the pull-tab 33 which is the same as that shown in the above-mentioned fifth embodiment, and is provided with an IC tag, as the IC tag 40 to be mounted on this pull-tab 33, which is not provided with the matching circuit 50 as shown in the first to third embodiments.

Figure 20:
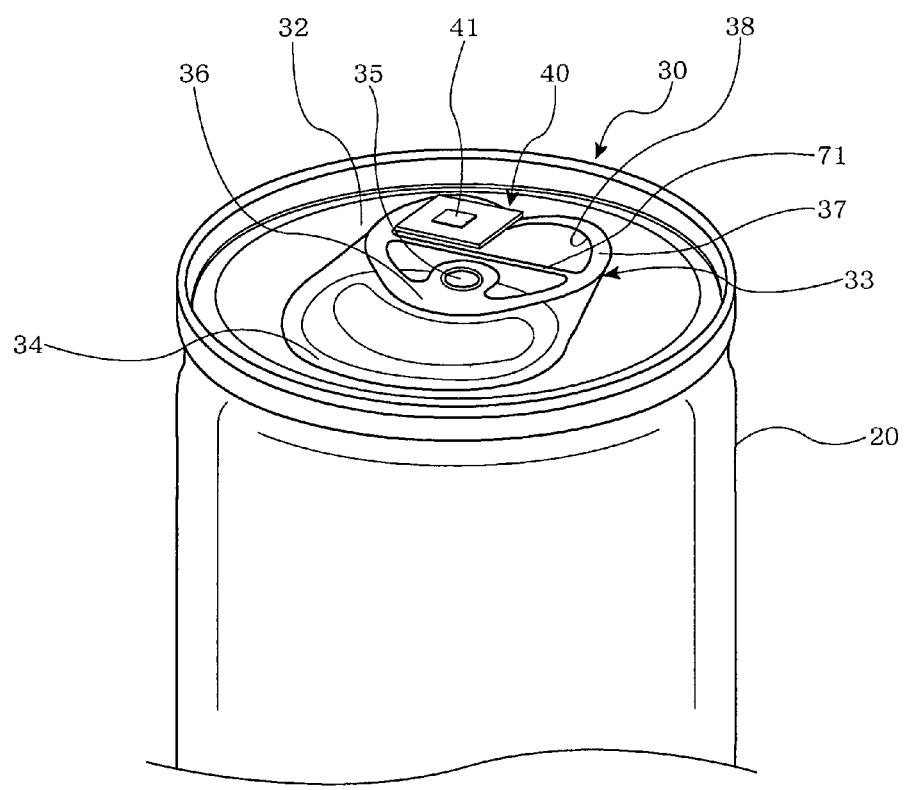
FIG. 20 is a partially-enlarged perspective view of the metallic cover provided with an IC tag and the metallic container provided with this metallic cover according to the sixth embodiment of the present invention.
Figure 21:
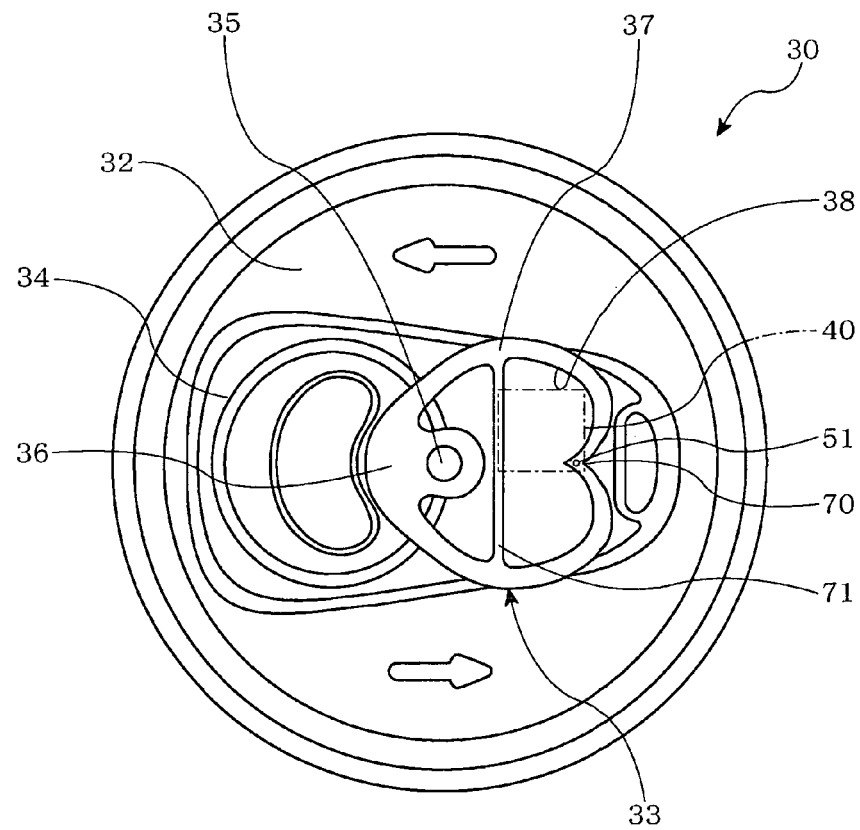
FIG. 21 is a view showing the metallic cover provided with an IC tag and the metallic container provided with this metallic cover according to the sixth embodiment of the present invention, in which (a) is a plan view and (b) is a cross-sectional side view.
Figure 21:
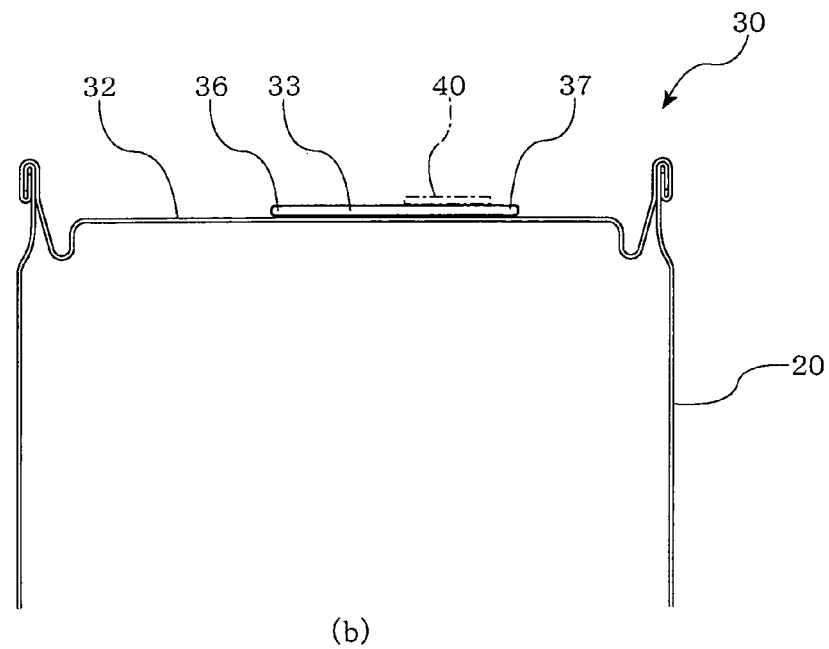

FIG. 20 is a perspective view showing the state in which the metallic cover according to this embodiment is connected with the container main body. FIG. 21 is a view showing the metallic cover according to this embodiment, in which (a) is a plan view and (b) is a side cross-sectional view.

As shown in these figures, the metallic cover 30 has a configuration in which it is provided with a circular cover panel 32 and the pull-tab 33. The tab 33 is formed in an almost heart-like shape as in the case of the above-mentioned fifth embodiment.

Specifically, as shown in FIG. 21, the tab 33 of this embodiment has, in the front end of its ring part 37, the approximately V-shaped recess part 70 which is formed toward the fixing part 36. The ring part 37 is formed in an almost heart-like shape having a larger lateral width. The ring hole 38 is formed along the outer contour. Further, the ring part 37 is provided with a installation bar 71 which provided across the ring hole 38.

On the ring hole 38 of the ring part 37 of this tab 33, the IC tag 40 is provided.

As mentioned above, in this embodiment, the pull-tab 33 is allowed to function as the antenna of the IC tag 40, and is formed into a predetermined shape such that it has an impedance with which a predetermined actual gain as the antenna can be obtained. As a result, in this embodiment, no matching circuit shown in the first to third embodiments is required to be provided.

As for the frequency bond used in the IC tag 40, there are several kinds of frequency band such as a band of less than 135 kHz, a 13.56 MHz band, a 860 M to 960 MHz band belonging to the so-called UHF band and a 2.45 GHz band. A communication distance with which wireless communication is possible varies depending on the frequency band used, and an optimum antenna length, a wiring pattern or the like varies depending on the frequency band.

In order to allow the metallic cover 30 to function as an antenna, by setting the diameter or the area of the metallic cover 30 to a predetermined value, the antenna is allowed to be one suitable to a specific frequency band (for example, 2.45 GHz band).

Figure 22:
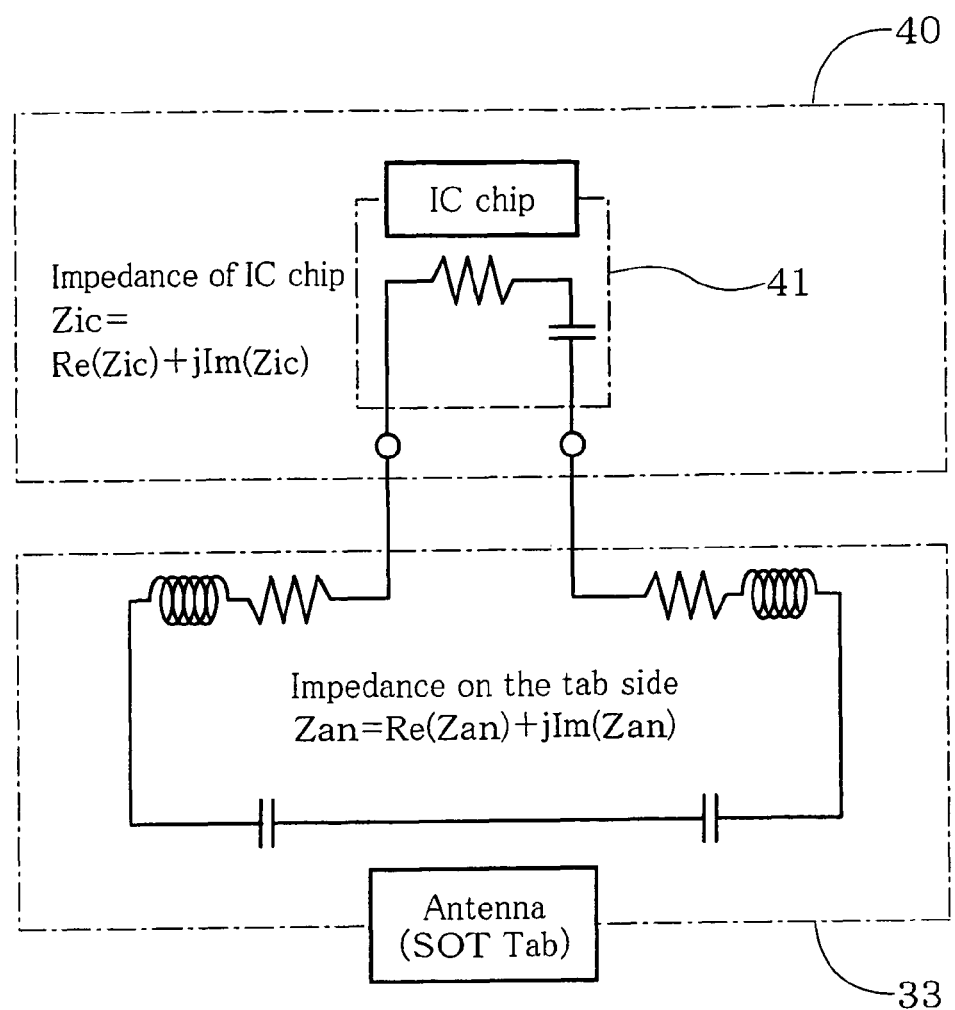
FIG. 22 is an equivalent circuit diagram in the metallic cover provided with an IC tag and the metallic container according to the sixth embodiment of the present invention.

FIG. 22 shows an equivalent circuit diagram in the metallic cover and the metallic container according to this embodiment.

In the IC chip 41 and the tab 33 as the antenna part of the IC tag, it is preferred that the impedance (Zan) of the tab 33 and the impedance (Zic) of the IC chip 41 part be matched. As for impedance matching, in the impedance of the IC chip 41 and the impedance of the antenna (tab 33), the best performance can be obtained when the value of the real number part component of the IC chip 41 and the value of the real number part component of the antenna coincident ({Re(Zic)}={Re(Zan)}) and the sum of the imaginary number part component of the IC chip 41 and the imaginary number part component of the antenna becomes 0 ({Im(Zic)}+{Im(Zan)}=0).

If these values are not matched, the performance of the IC tag 40 is deteriorated.

In this embodiment, the tab 33 constituting the antenna is configured such that the relationship between the real number part component {Re(Zan)} of the impedance thereof (Zan) and the real number part component {Re(Zic)} of the impedance of the IC chip (Zic) satisfies the following formula (1), and the relationship between the imaginary number part component {Im(Zap)} of the impedance of the tab (Zan) and the imaginary number part component {Im(Zic)} of the IC chip (Zic) satisfies the following formula (2):

$$Re(Zan)=Re(Zic) \quad \text{Formula (1)}$$

$$Im(Zan)=-Im(Zic) \quad \text{Formula (2)}$$

Further, in the metallic cover 30, since the tab 33 as the antenna has a positive value of imaginary number part component {Im(Zan)} of the impedance (Zan) in the communication frequency band, the impedance matching of the IC chip 41 and the tab 33 as the antenna is conducted, whereby the return loss can be decreased.

That is, as for the tab 33, when the imaginary number part component {Im(Zan)} of the impedance (Zan) thereof satisfies 0<{Im(Zan)}, the impedance matching between the IC chip 41 and the tab 33 can be conducted without fail. The reason therefor is that since the IC chip 41 for the IC tag is provided with a rectification circuit for converting energy of electric waves from a reader/writer to direct current components and this rectification circuit has reactance components, the imaginary number part component of the impedance thereof tends to be negative.

Therefore, in this embodiment, the tab 33 constituting the antenna is set such that the imaginary number part component {Im(Zan)} of the impedance (Zan) thereof satisfies the following formula (3):

$$0<\{Im(Zan)\} \quad \text{Formula (3)}$$

In this embodiment, by forming the outer contour of the tab 33 into a predetermined shape, the above-mentioned relationships shown by the formulas (1) to (3) can be obtained.

Specifically, the tab 33 is formed such that the circumferential length L of the ring part 37 becomes 28 mm≤L.

By allowing the tab to have such a shape, the length of current flowing in the tab 33 is optimized. That is, both the real number part component and the imaginary number part component of the impedance of the tab 33 can be optimized. As a result, the sum of the imaginary number part component of the IC chip 41 and the imaginary number part component of the tab 33 can be close to "0", impedance matching can be conducted, whereby a long communication distance can be ensured.

As a result, in this embodiment, no matching circuit shown in the first to third embodiments is required to be provided.

As mentioned above, in this embodiment, due to a change in tab structure, such as an increase in circumferential length of the ring part 37 of the tab 33, the reactance region (imaginary number part component) of the impedance can be adjusted. As a result, a long communication distance can be ensured.

That is, in a predetermined communication frequency band (this embodiment 2.40 GHz-2.4835 GHz), an imaginary number part component {Im(Aan)} of the impedance (Zan) of the tab 33 can have a positive value.

In this way, the IC chip 41 is provided with a rectification circuit for converting energy of electric waves from the reader/writer into direct current components which have reactance components. Therefore, when the imaginary number part component {Im(Aan)} of the tab 33 has a positive value, the sum of the imaginary number part components {Im(Zan)} and {Im(Zic)} can be "0" or can be close to "0", then the tab 33 can obtain a good actual gain as the antenna.

(IC Tag)

The IC tag 40 of this embodiment which does not have a matching circuit is provided with the IC chip 41 which is mounted on the square substrate. The substrate may be a film and can take an arbitral shape.

This IC tag 40 is mounted on the pull-tab 33 of the metallic cover 30.

The substrate on which the IC chip 41 is mounted is formed of a glass epoxy resin or the like, and a side of the IC chip 41 and a side of the metallic cover 30 are insulated.

The IC chip 41 is allowed to be electrically connected with the tab 33 through a metallic contact part. It suffices that the contact part of the IC chip 41 is electrically connected with the tab 33 in at least one part. Therefore, a plurality of contact parts may be provided.

In this embodiment, since the metallic cover 30 is allowed to function as the antenna, by setting the outer contour of the pull-tab 33 to a predetermined size as mentioned above, it can be an antenna which is suited to a specific frequency band (for example, a 2.45 GHz band).

(Communication Properties)

Figure 23:
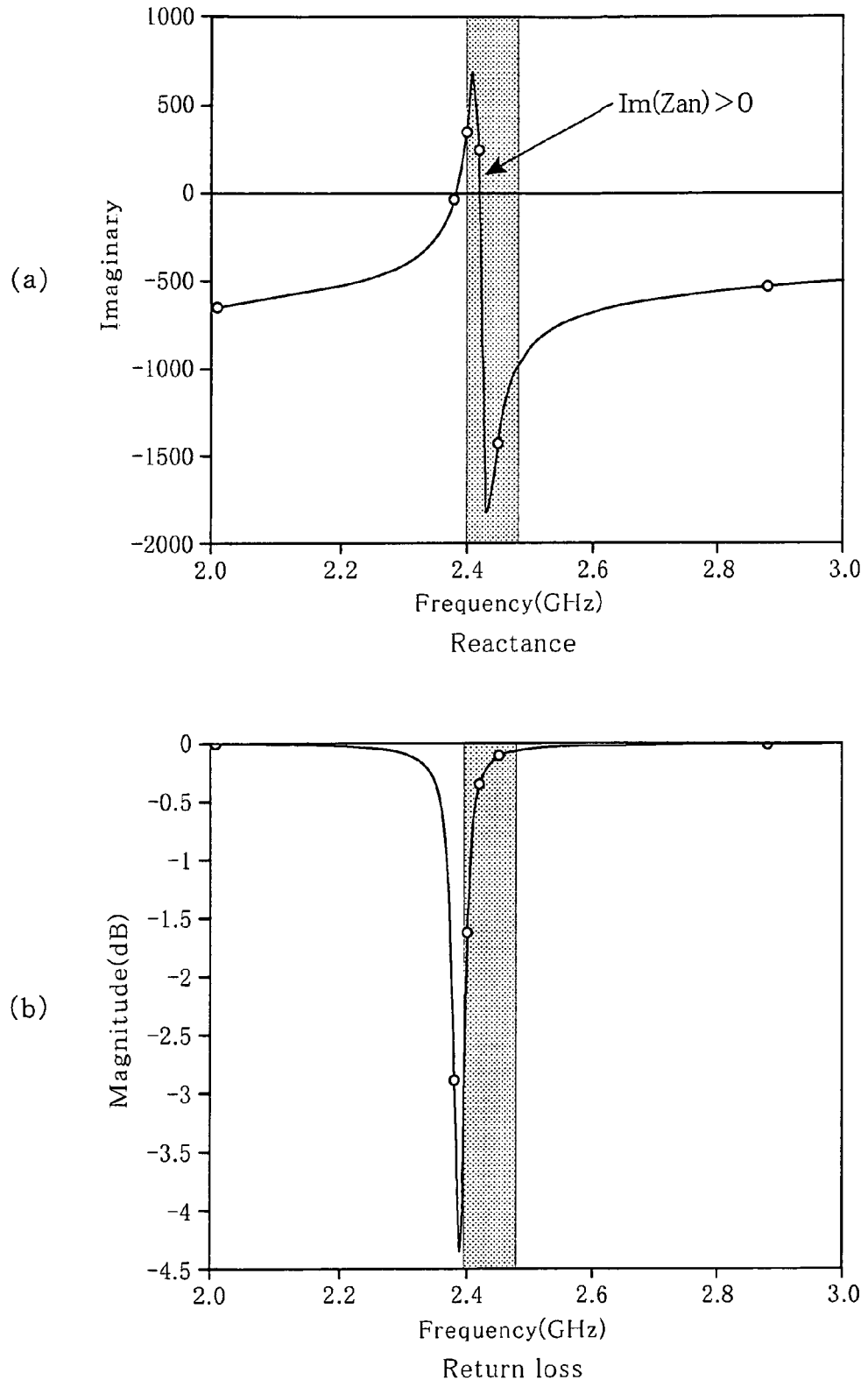
FIG. 23 is a graph showing the properties of the metallic cover according to the sixth embodiment of the present invention, in which (a) is a graph showing the relationship between the resonance frequency of the IC tag when it is mounted on the metallic cover and the imaginary number part component of the impedance of the antenna, and (b) is a graph showing the relationship between the resonance frequency of the IC tag when it is mounted on the metallic cover and the return loss.

Next, communication properties of the metallic cover with the above-mentioned configuration will be explained with reference to FIG. 23. FIG. 23 shows the results of a simulation using, as the IC chip 41, one having an impedance of Zic=20–j50.

FIG. 23 is a graph showing the properties of the metallic cover according to this embodiment, in which (a) is a graph showing a relationship between the resonance frequency of the IC tag mounted on the metallic cover and the imaginary part component {Im(Zan)} of the impedance Zan of the antenna and (b) is a graph showing a relationship between the resonance frequency of the IC tag mounted on the metallic cover and a return loss.

As shown in FIG. 23, in the metallic cover of this embodiment, the imaginary number part component {Im(Zan)} of the impedance Zan of the antenna is positive (Im(Zan)>0) (see FIG. 23(a)) in a region of about 2.40 GHz to 2.42 GHz in a communication frequency band (2.40 GHz to 2.4835 GHz), and the best performance of the return loss is about –3.8 dB (at a frequency of about 2.40 GHz) (see FIG. 23(b)), and good communication properties can be obtained.

As mentioned hereinabove, according to the metallic cover provided with an IC tag according to this embodiment, by allowing the tab 33 to be formed into a predetermined shape so that the tab has an impedance with which a predetermined actual gain can be obtained as the antenna, the communication distance can be significantly prolonged as compared with the case where the IC chip 41 is mounted as it is on the existing tab.

That is, if the ring part 37 or the like of the tab 33 is formed into a predetermined shape, since the real number part component and the imaginary number part component of the impedance can be a predetermined value according to the shape, the transmission properties of signals between the IC chip and the tab as the antenna become good, whereby the tab can be functioned as an antenna having a predetermined actual gain.

Further, impedance matching can be conducted according to the shape of the tab 33, no matching circuit as that shown in the first to third embodiments is required to be provided, and an existing IC chip can be used as it is, whereby an IC tag for metals good in flexibility and extensibility can be realized.

In addition, since the IC chip 41 electrically contacts the tab 33, the metallic cover 30 is allowed to function as the antenna for an IC tag, and the metallic cover 30 and the IC chip 41 are integrally formed to constitute the IC tag 40.

As a result, only by mounting the IC chip 41 on the cover part of the metallic container 10, the metallic container 10 provided with an IC tag can be constituted, whereby a sufficient antenna length required for communication can be ensured by an antenna formed of the metallic cover 30 while downsizing the IC tag 40 main body, and problems such as deterioration of communication properties by metals can be solved.

Further, by allowing part or all of the metallic container 10 to be served as an antenna, no antenna on the side nearer to the IC tag 40 is required to be provided, and hence, not only the cost for an antenna can be reduced but also the tag can be downsized as small as possible, whereby a small-sized and inexpensive IC tag for metals can be realized.

In this embodiment, since the IC tag 40 can be constituted only by mounting the IC chip 41 on the metallic cover 30 which is seemingly a dead space. The IC tag 40 which is formed of the metallic cover 30 is arranged on the upper surface of the metallic cover 10, and hence, the appearance of the container is not deteriorated. In addition, even when the metallic container 10 is stored and displayed, it is not hidden by other containers, goods or the like, communication with a reader/writer can be conducted in any state, whereby the function and properties as an IC tag can be fully exhibited.

As mentioned above, according to this embodiment, since the IC tag 40 is formed of the cover part of the metallic container 10, the IC tag becomes seemingly less visible, and as a result, the original appearance and design of the container can be kept favorable without the fear that the appearance of the container is deteriorated by the attachment of the IC tag 40.

Further, when the IC tag 40 is seemingly less conspicuous, it becomes hard to be recognized by human eyes, and manipulated peeling, breakage or the like of the IC tag 40 can also be prevented.

Further, the metallic cover 30 seldom contacts other containers or apparatuses, other goods or the like during storage, shipping, displaying or the like of the container, and hence, the IC chip 41 mounted on the metallic cover 30 can be effectively prevented from breaking or dropping from the container when it contacts other containers, goods or the like.

Seventh Embodiment

Next, the metallic cover and the metallic container according to the seventh embodiment of the present invention will be explained with reference to FIGS. 24 to 26.

Figure 24:
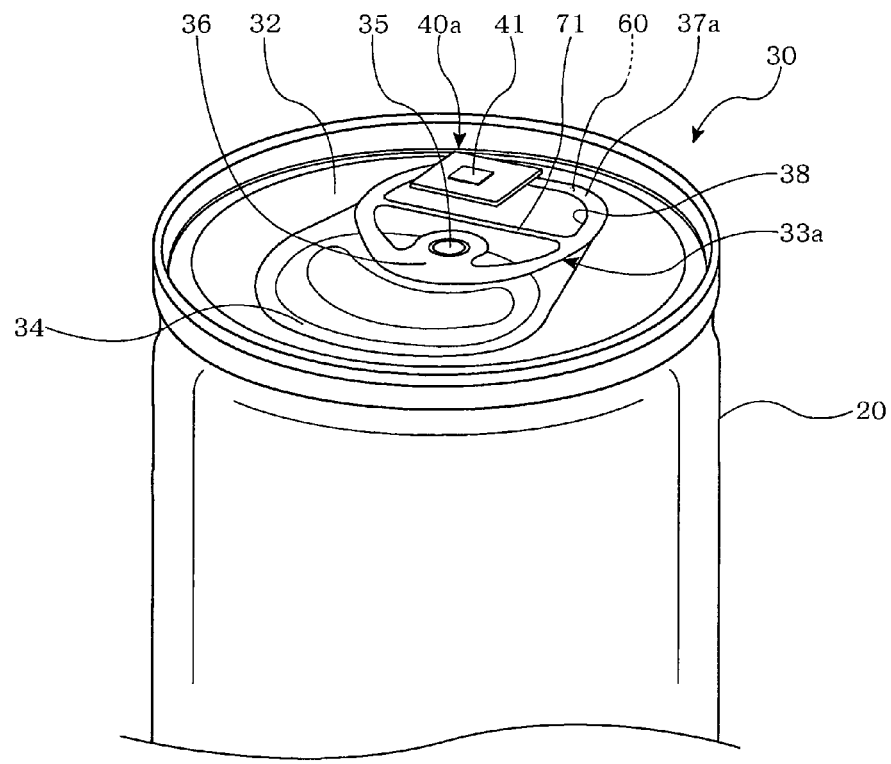
FIG. 24 is a partially-enlarged perspective view showing the metallic cover provided with an IC tag and the metallic container provided with this metallic cover according to the seventh embodiment of the present invention.
Figure 25:
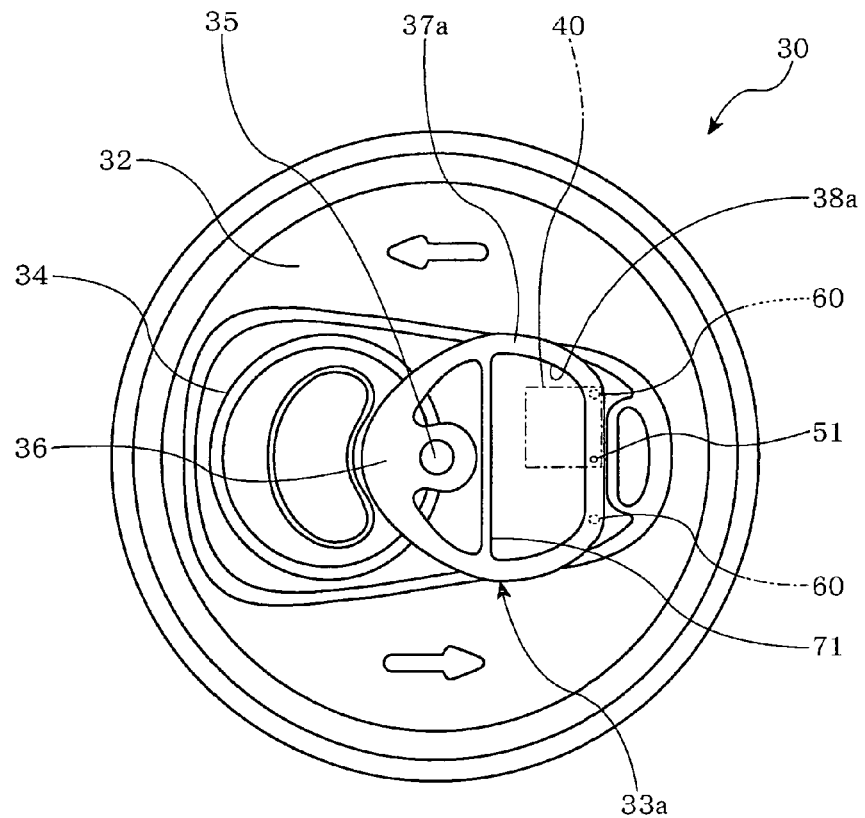
FIG. 25 is a view showing the metallic cover provided with an IC tag and the metallic container provided with this metallic cover according to the seventh embodiment of the present invention, in which (a) is a plan view and (b) is a cross-sectional side view.
Figure 25:
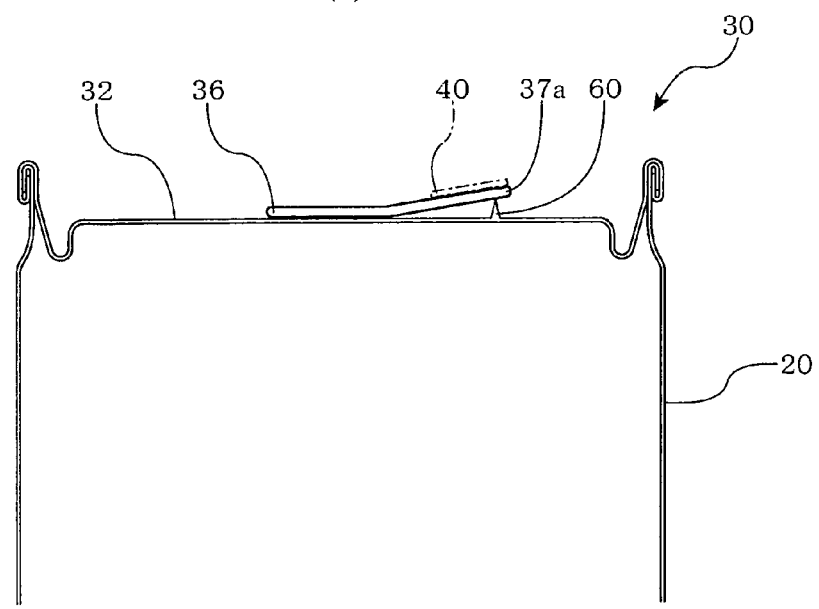

FIG. 24 is an enlarged view showing part of the metallic cover and the metallic container according to this embodiment. FIG. 25 is a view showing the metallic cover and the metallic container according to this embodiment, in which (a) is a plan view and (b) is a side cross-sectional view.

As shown in these figures, the metallic cover 30 according to this embodiment is a modified embodiment of the above-mentioned sixth embodiment, and differs from that of the sixth embodiment in that the tab 33a is formed in an approximate tear-drop shape having no recess part 70 (see FIG. 21) in the sixth embodiment.

Further, in this embodiment, the cover panel 32 is provided with, in two parts nearer to the front end part of the ring part 37a, a projection 60 which is formed in a protruded way such that the front thereof contacts this ring part 37a.

In this embodiment, the cover panel 32 is provided with, at a nearly middle part between the fixing part 35 of the ring part 37a and a part nearer to the front end, two projections 60 are provided such that the front ends thereof contact the ring part 37a.

The projection 60 is formed in about 0.3 mm in this embodiment.

As mentioned above, by providing the projection 60 on the metallic cover 30 and allowing this projection 60 to contact a tab 33a, the length of current flowing the tab 33a can be adjusted.

That is, by providing the projections 60 in different places or numbers, the impedance of the tab 33a can be an adequate value by adjusting the current length. Therefore, communication in a desired communication frequency band can be conducted more easily.

Between the front end edge of the ring part 37a and the inner circumference of the cover hook 31 of the cover panel 32, a space into which fingers can be inserted at the time of opening and closing is formed as in the case of the sixth embodiment.

Further, the rivet part 35 and the fixing part 36 are the same as in the sixth embodiment, and keep the opening properties.

(Communication Properties)

Communication properties of the metallic cover of this embodiment will be explained.

Figure 26:
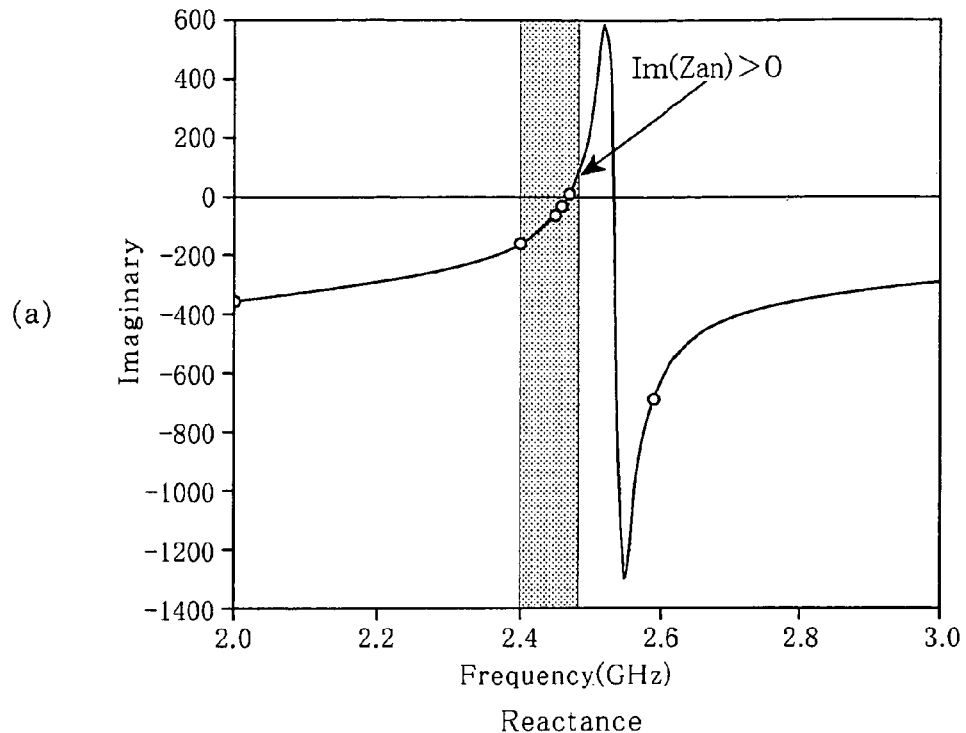
FIG. 26 is a graph showing the properties of the metallic cover according to the seventh embodiment of the present invention, in which (a) is a graph showing the relationship between the resonance frequency of the IC tag when it is mounted on the metallic cover and the imaginary number part component of the impedance of the antenna, and (b) is a graph showing the relationship between the resonance frequency of the IC tag when it is mounted on the metallic cover and the return loss.
Figure 26:
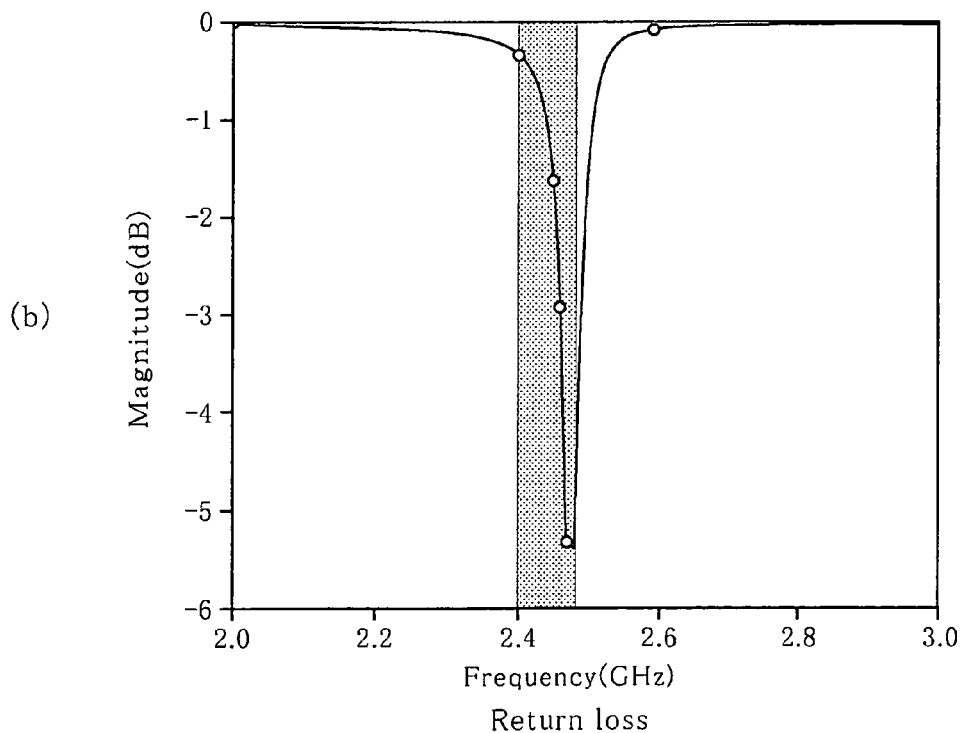

FIG. 26 is a graph showing the properties of the metallic cover according to this embodiment, in which (a) is a graph showing a relationship between the resonance frequency of the IC tag when it is mounted on the metallic cover and the imaginary number part component {Im(Zan)} of the impedance Zan of the antenna, and (b) is a graph showing a relationship between the resonance frequency of the IC tag when it is mounted on the metallic cover and the return loss.

As shown in FIG. 26, in the metallic cover of this embodiment, the imaginary number part component {Im(Zan)} of the impedance Zan of the antenna is positive (Im(Zan)>0) (see FIG. 26(a)) in a region of about 2.46 GHz to 2.4835 GHz in a communication frequency band, and the best performance of the return loss is about −5.5 dB (at a frequency of 2.47 GHz) (see FIG. 26(b)), and good communication properties can be obtained.

As explained above, in the metallic cover and the metallic container of this embodiment, as in the case of the above-mentioned sixth embodiment, the communication distance can be prolonged by matching of impedances of the IC chip 41 and the tab 33a as the antenna.

In this embodiment, in the metallic cover 30, in a communication frequency band, the frequency at which the imaginary number part components {Im(Zan)} become positive may differ from that of the sixth embodiment.

That is, by differing the shape of the tab 33a, a good return loss can be obtained at a desired frequency number, and the communication distance at this frequency number can be prolonged.

In addition, by providing the projection 60, it is possible to control the length of current flowing in the tab 33a.

That is, by providing the projection 60 in different places and numbers, the current length is adjusted to allow the impedance of the tab 33a to be an adequate value, whereby the communication in a desired communication frequency band can be conducted more easily.

Eighth Embodiment

Next, the metallic cover and the metallic container according to the eighth embodiment of the present invention will be explained with reference to FIGS. 27 to 29.

Figure 27:
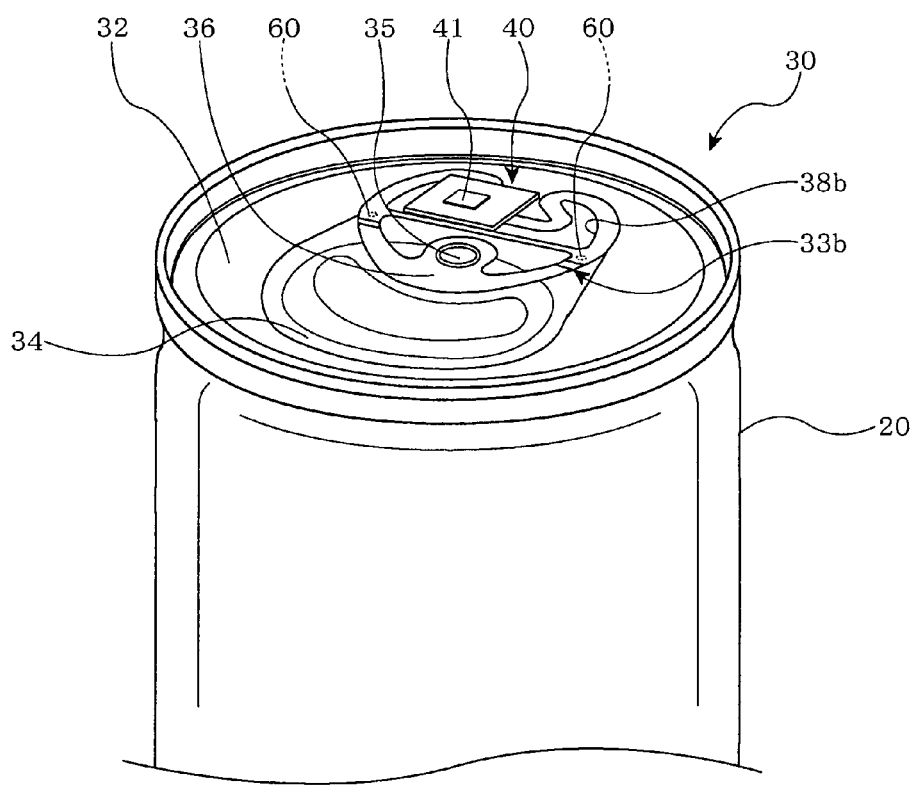
FIG. 27 is a partially-enlarged perspective view of the metallic cover provided with an IC tag and the metallic container provided with this metallic cover according to the eighth embodiment of the present invention.
Figure 28:
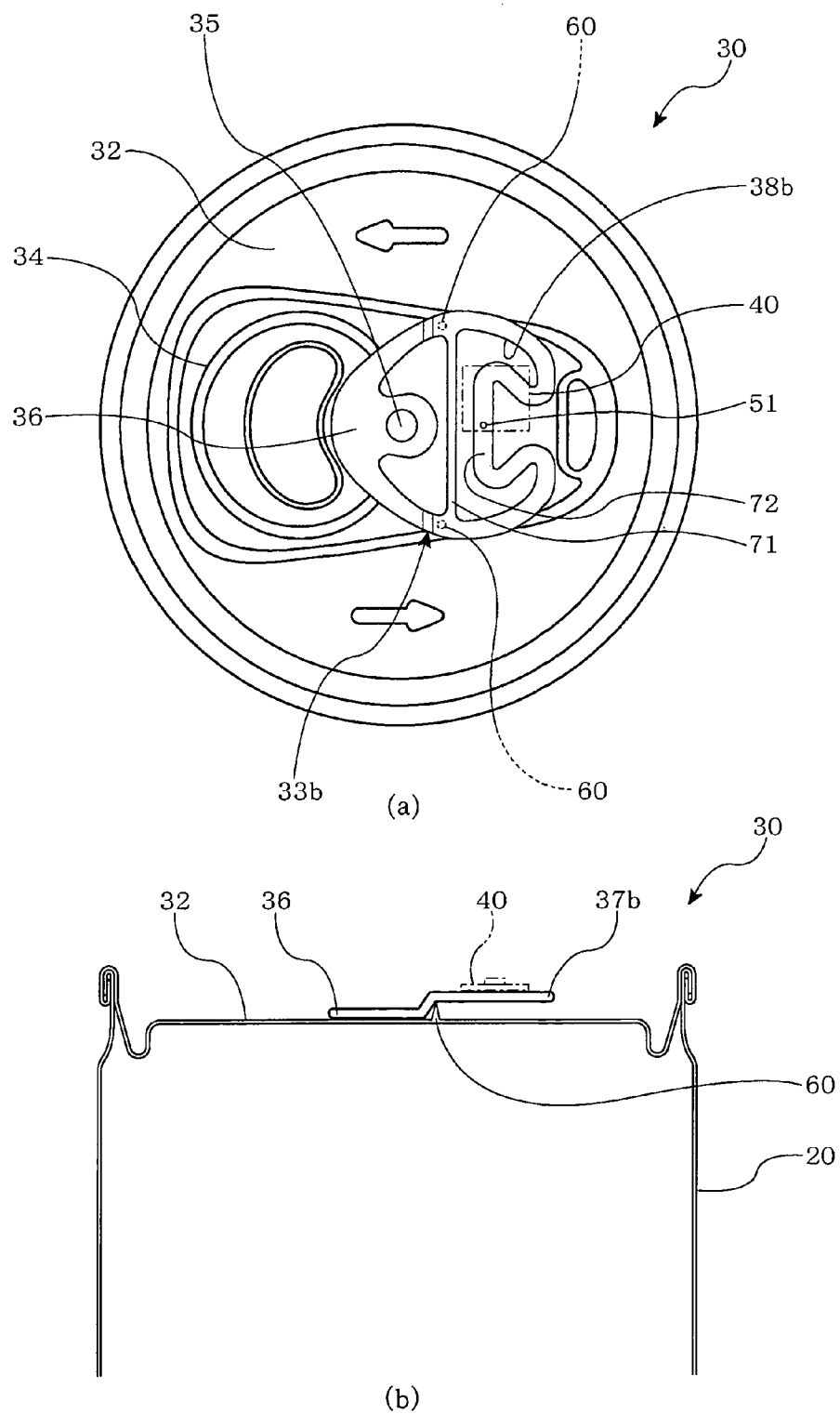
FIG. 28 is a view showing the metallic cover provided with an IC tag and the metallic container provided with this metallic cover according to the eighth embodiment of the present invention in which (a) is a plan view and (b) is a cross-sectional side view.

FIG. 27 is an enlarged perspective view of the IC tag in the metallic cover and the metallic container according to this embodiment. FIG. 28 is an enlarged view of part of the metallic cover and the metallic container according to this embodiment, in which (a) is a plan view and (b) is a side cross-sectional view.

As shown in these figures, in the metallic cover 30 of this embodiment, the shape of the tab 33b differs from that in the above-mentioned sixth and seventh embodiments.

Specifically, as compared with that of the seventh embodiment, in the tab 33b, in the front end part of the ring part 37b, a recess part 72 which is formed in an approximately triangle-shape is provided on the side nearer to the fixing part 36. Other configurations are the same as those in the seventh embodiment.

Due to such a configuration, since the ring part 37b of the tab 33b becomes large, the length of current flowing in the tab 33b is adjusted, whereby the real number part component {Re(Zan)} and the imaginary number part component {Im(Zan)} of the impedance (Zan) of the tab 37b as an antenna can be a value larger than a predetermined value.

(Communication Properties)

Communication properties of the metallic cover of this embodiment will be explained.

Figure 29:
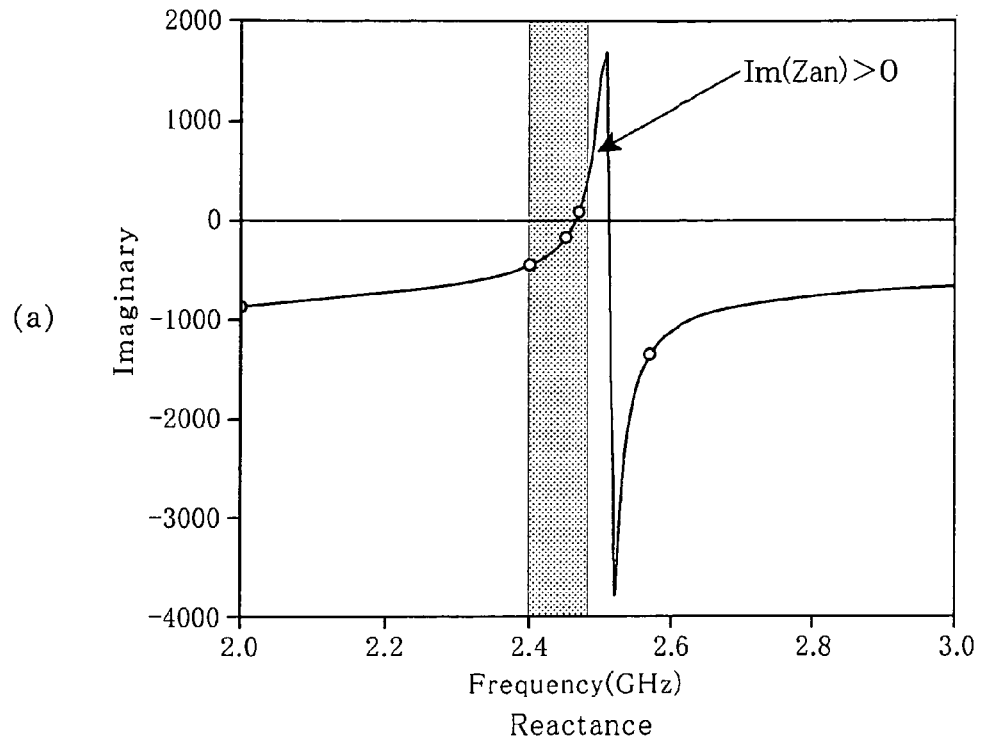
FIG. 29 is a graph showing the properties of the metallic cover according to the eighth embodiment of the present invention, in which (a) is a graph showing the relationship between the resonance frequency of the IC tag when it is mounted on the metallic cover and the imaginary number part component of the impedance of the antenna, and (b) is a graph showing the relationship between the resonance frequency of the IC tag when it is mounted on the metallic cover and the return loss.
Figure 29:
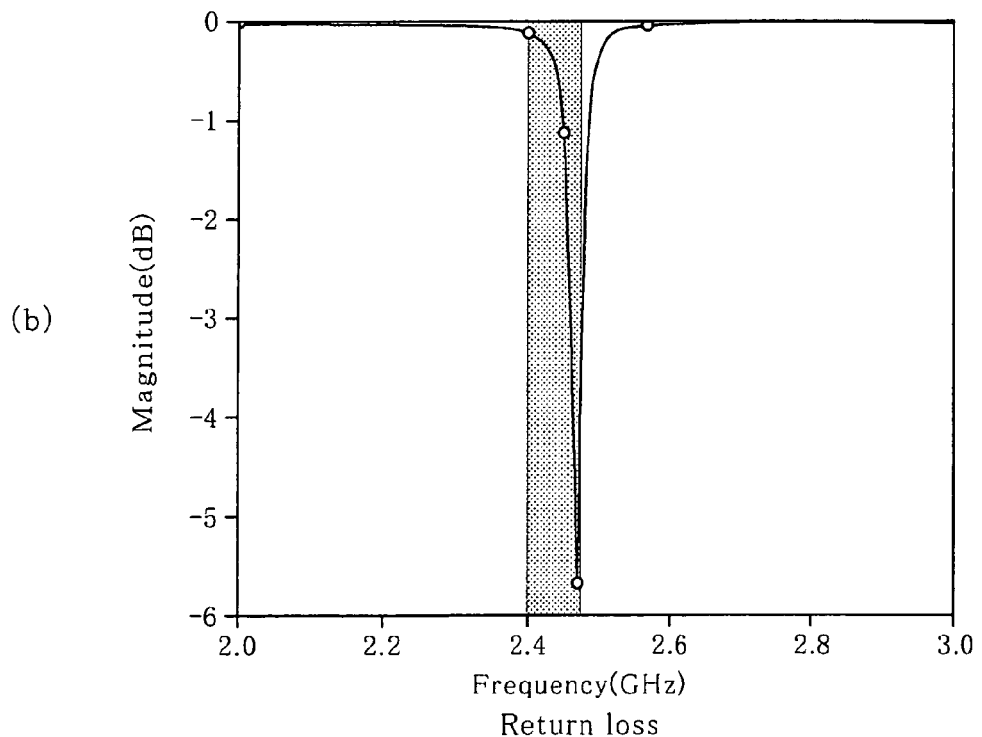

FIG. 29 is a graph showing the properties of the metallic cover according to the eighth embodiment of the present invention, in which (a) is a graph showing the relationship between the resonance frequency number of the IC tag mounted on the metallic cover and the imaginary number part component {Im(Zan)} of the impedance (Zan) of the antenna, and (b) is graph showing the relationship between the resonance frequency of the IC tag mounted on the metallic cover and the return loss.

As shown in FIG. 29, in the metallic cover of this embodiment, the imaginary number part component {Im(Zan)} of the impedance Zan of the antenna is positive (Im(Zan)>0) (see FIG. 29 (a)) in a region of about 2.46 GHz to 2.4835 GHz in a communication frequency band, and the best performance of the return loss is about −5.8 dB (at a frequency of 2.47 GHz) (see FIG. 29(b)), and good communication properties can be obtained.

As mentioned above, in the metallic cover and the metallic container of this embodiment, since the shape of the ring part 37b of the tab 33b is large, the length of current flowing in the tab 33b can be adjusted, and as in the case of the above-mentioned sixth and seventh embodiments, good communication properties of the IC tag 40 can be obtained.

The comparative example of the metallic cover in each embodiment of the present invention will be explained with reference to FIGS. 30 to 33.

Figure 30:
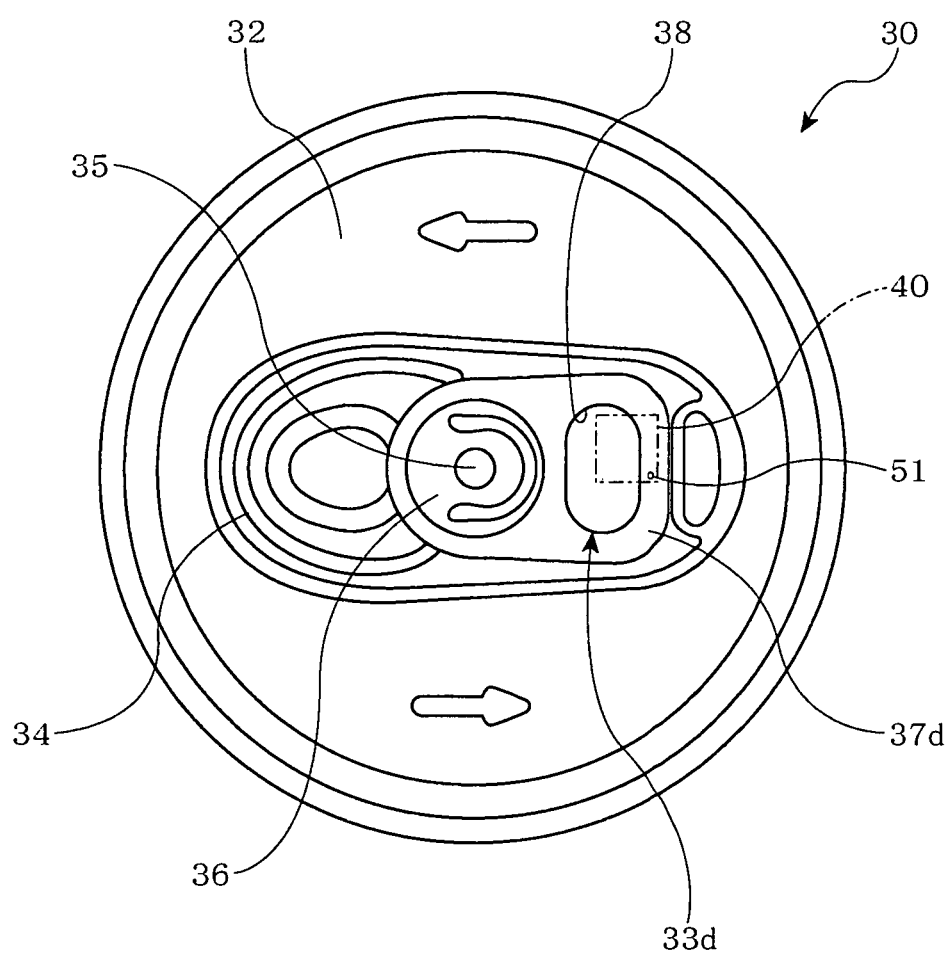
FIG. 30 is a plan view showing the metallic cover provided with an IC tag and the metallic container provided with this metallic cover according to the first comparative example of the present invention.

FIG. 30 shows a metallic cover according to the first comparative example.

As shown in the figure, the metallic cover of this comparative example is a cover in which the same IC tag 40 as mentioned above is mounted on the cover of the existing steel can. In the IC tag 40, the front end side of the tab 33d is electrically connected by the contact part 51.

Figure 31:
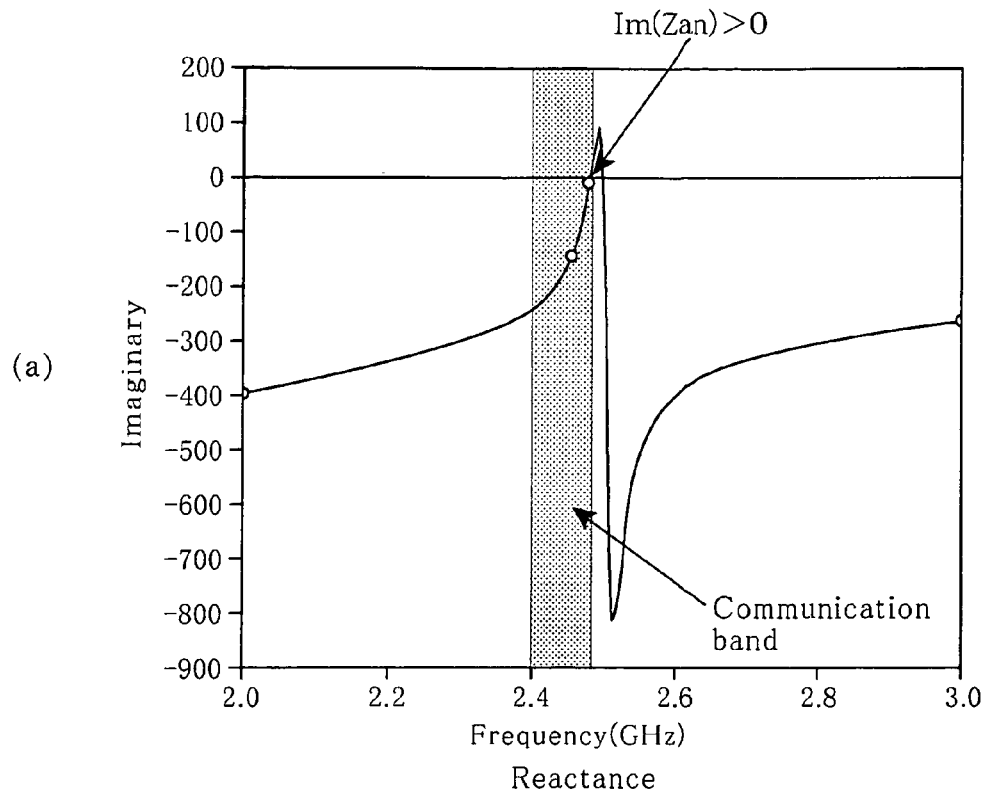
FIG. 31 is a graph showing the properties of the metallic cover according to the first comparative example of the present invention, in which (a) is a graph showing the relationship between the resonance frequency of the IC tag when it is mounted on the metallic cover and the imaginary number part component of the impedance of the antenna, and (b) is a graph showing the relationship between the resonance frequency of the IC tag when it is mounted on the metallic cover and the return loss.
Figure 31:
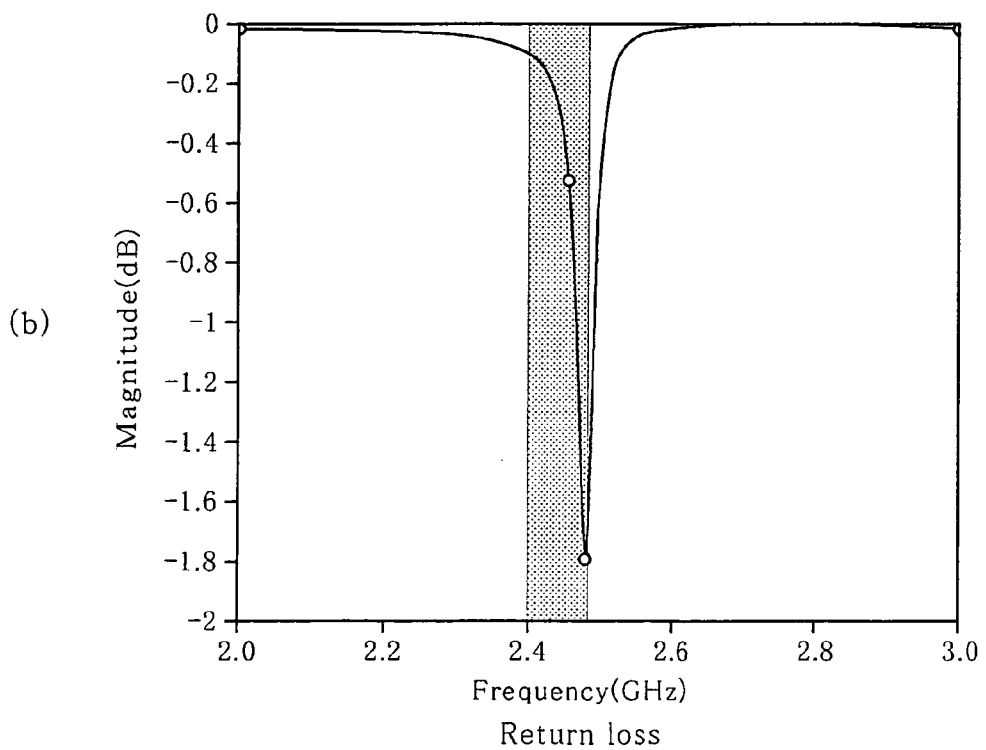

FIG. 31 is a graph showing the properties of the metallic cover according to the first comparative example, in which (a) is a graph showing the relationship between the resonance frequency of the IC tag mounted on the metallic cover and the imaginary number part component {Im(Zan)} of the impedance (Zan) of the antenna, and (b) is a graph showing the relationship between the resonance frequency of the IC tag mounted on the metallic container and the return loss.

In the metallic cover of this first comparative example, the imaginary number part component {Im(Zan)} of the impedance of the antenna Zan is positive (Im(Zan)>0) (see FIG. 31 (a)) in a small region of about 2.47 GHz to 2.4835 GHz in a communication frequency band, and the best performance of the return loss is about −1.75 dB (at a frequency of 2.47 GHz) (see FIG. 31(b)), and it was revealed that, although the actual gain was decreased, communication was possible at the time of contact when a communication test was conducted by using a reader/writer with a specific small power.

Figure 32:
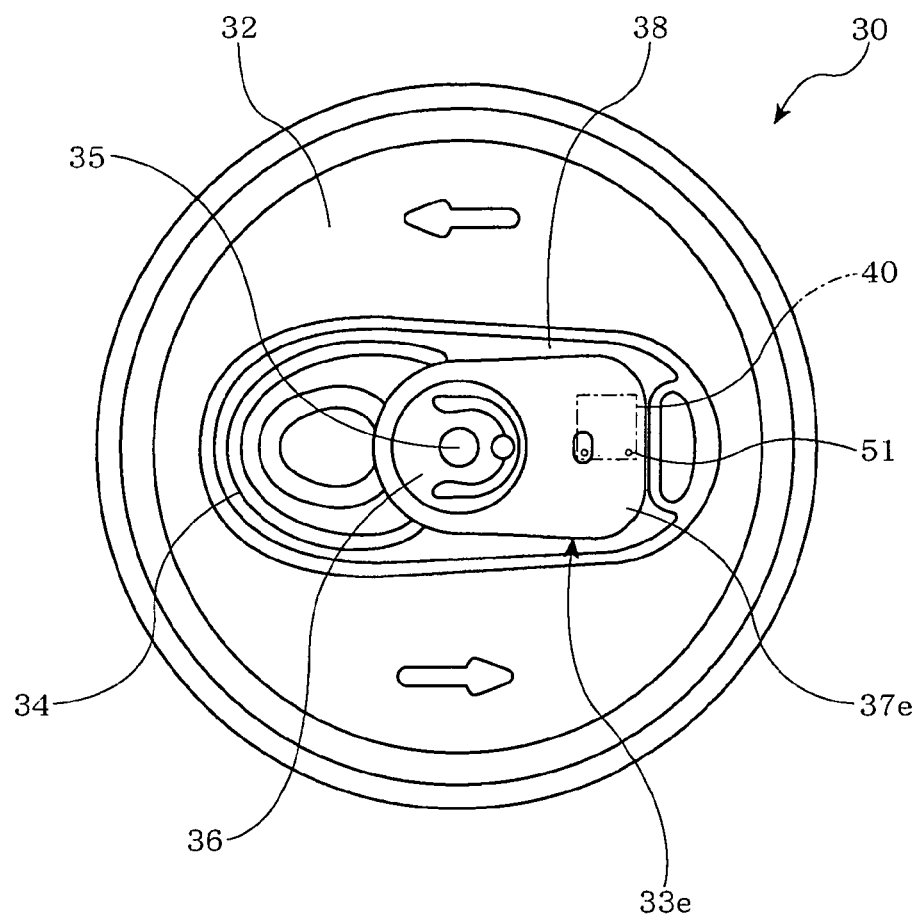
FIG. 32 is a plan view showing the metallic cover provided with an IC tag and the metallic container provided with this metallic cover according to the second embodiment of the present invention.

FIG. 32 shows a metallic cover according to the second comparative example.

As shown in FIG. 32, in the metallic cover of this comparative example, as compared with the above-mentioned first comparative example, the ring hole 38 of the tab 33e is formed to have a diameter of about 2 mm. Other configurations are the same as those of the first comparative example.

Figure 33:
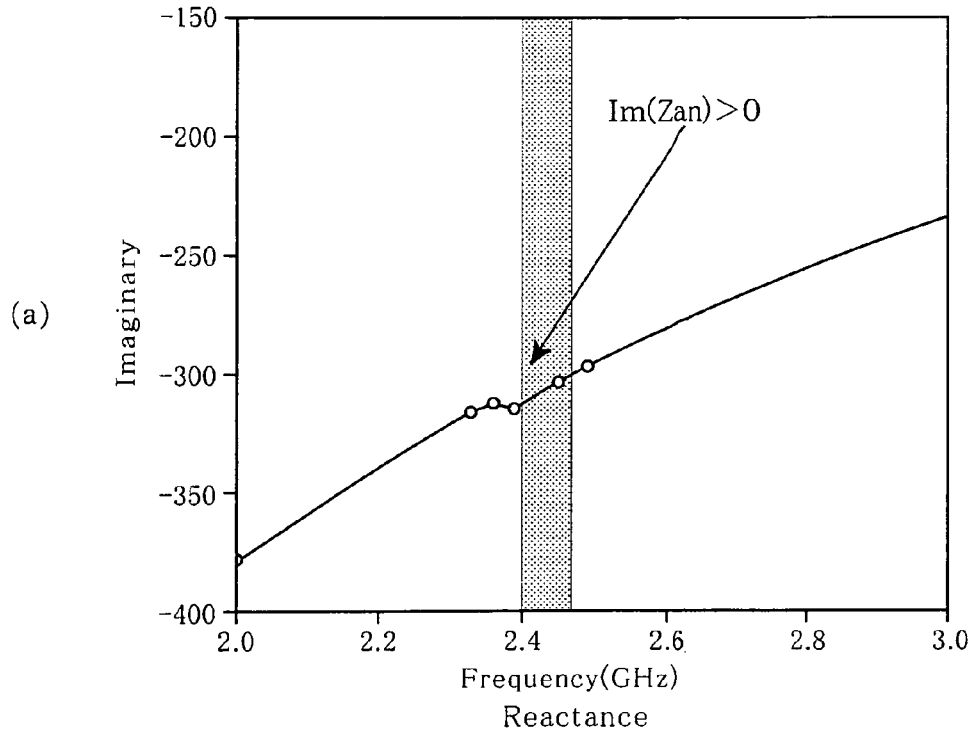
FIG. 33 is a graph showing the properties of the metallic cover according to the second comparative example of the present invention, in which (a) is a graph showing the relationship between the resonance frequency of the IC tag when it is mounted on the metallic cover and the imaginary number part component of the impedance of the antenna, and (b) is a graph showing the relationship between the resonance frequency of the IC tag when it is mounted on the metallic cover and the return loss.
Figure 33:
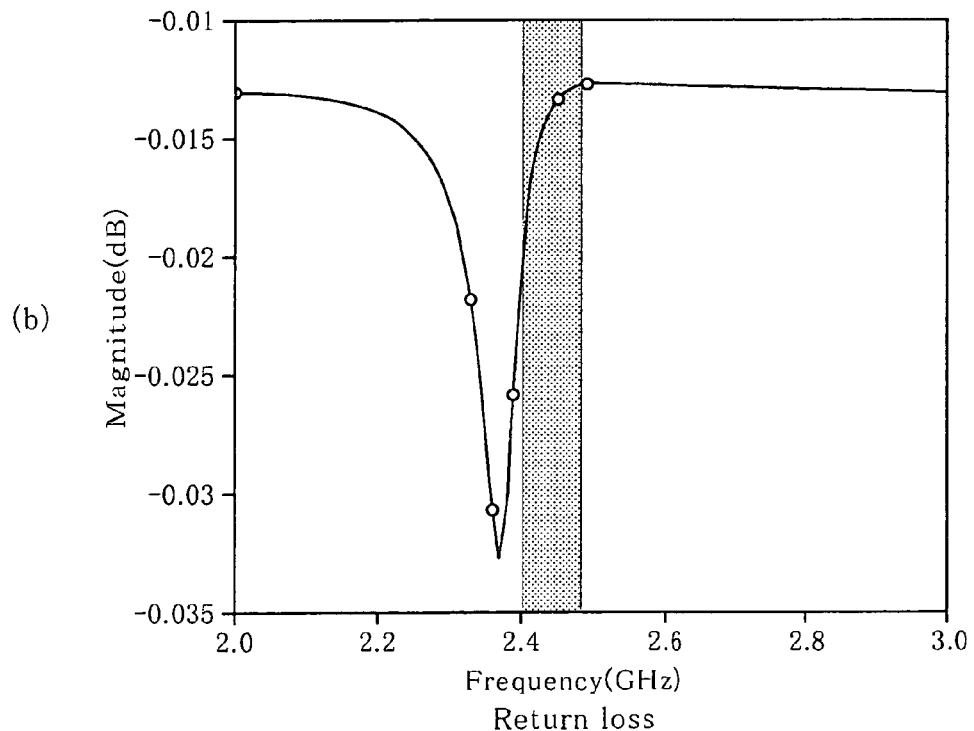
Figure 34:
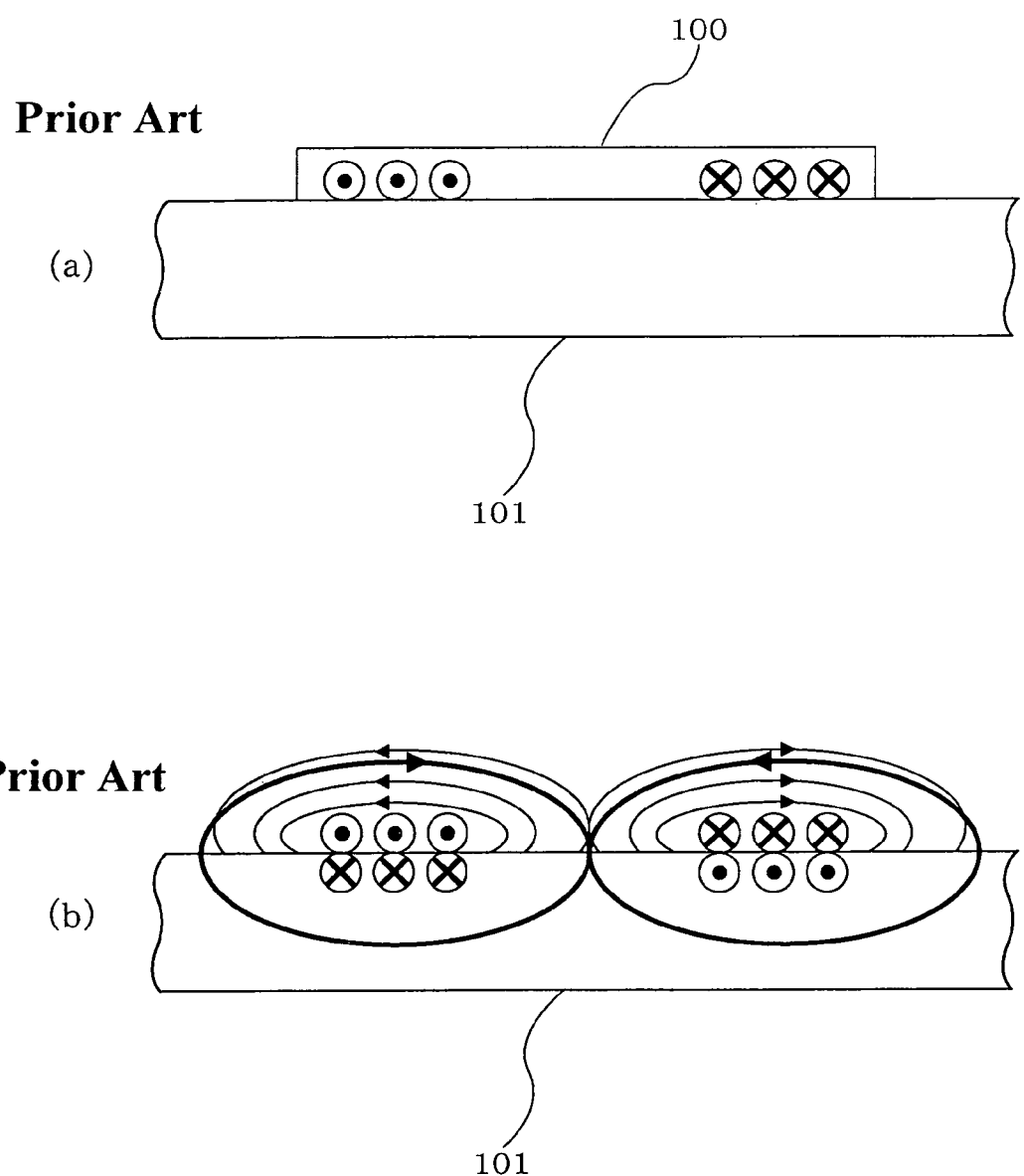
FIG. 34 is an explanatory view diagrammatically showing the state of the communication properties in which an IC tag is mounted on a conventional, common metallic container, in which (a) shows the state of the IC tag mounted on the metallic container and (b) shows the state of magnetic flux generated by the IC tag shown in (a)
Figure 35:
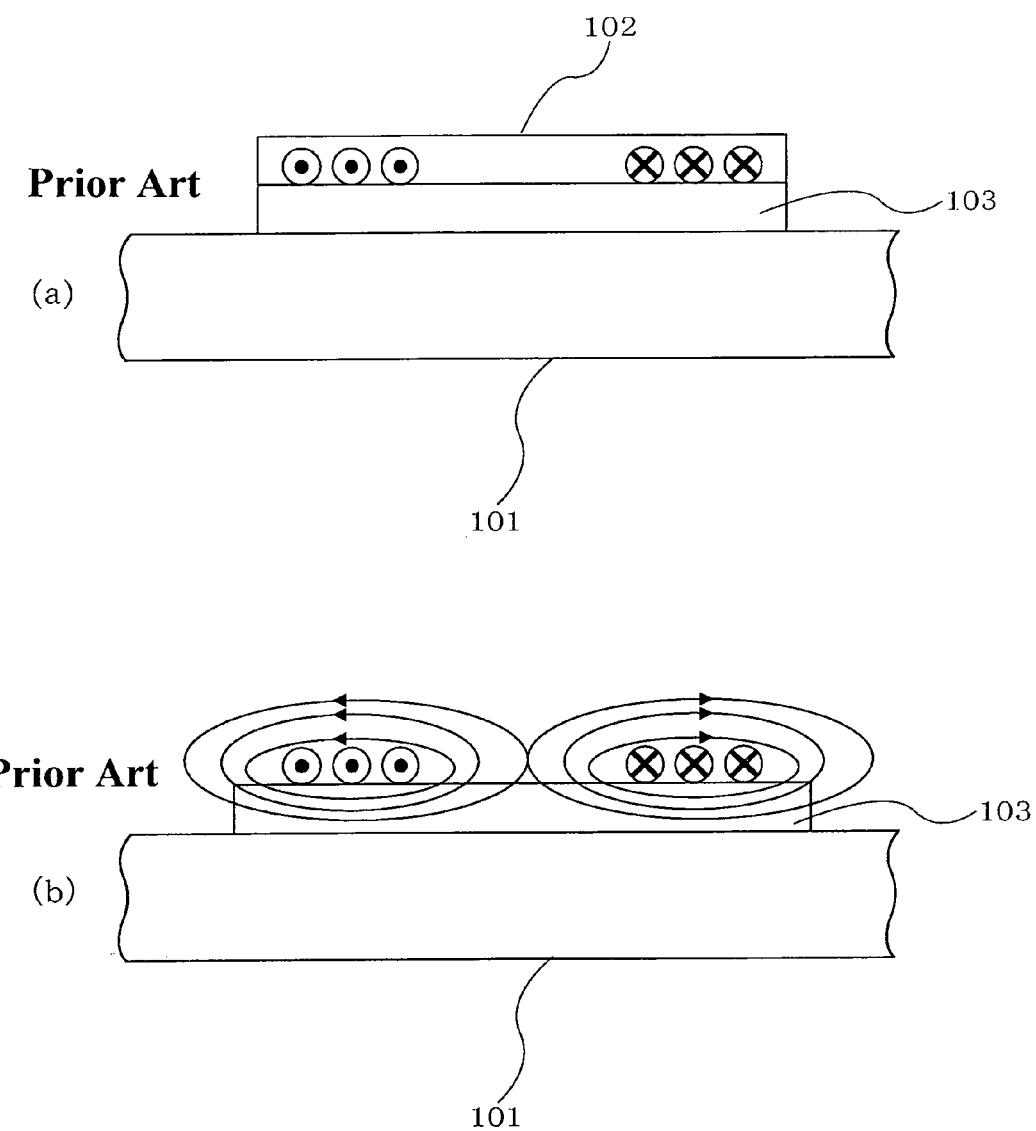
FIG. 35 is an explanatory view diagrammatically showing the state of communication properties when a conventional IC tag for metals is mounted on the metallic container, in which (a) shows the state of the IC tag for metals which is mounted on the metallic container and (b) shows the state of magnetic flux generated by the IC tag for metals shown in (a).

FIG. 33 is a graph showing the properties of the metallic cover according to the second comparative example, in which (a) is a graph showing the relationship between the resonance frequency of the IC tag mounted on the metallic cover and the imaginary number part component {Im(Zan)} of the impedance (Zan) and (b) is a graph showing the relationship between the resonance frequency of the IC tag mounted on the metallic cover and the return loss.

In the metallic cover of this second comparative example, there is no region in which an imaginary number part component {Im(Zan)} of the impedance Zan of the antenna is positive (see FIG. 33 (a)) and the best performance of the return loss is about −0.032 dB (at a frequency of 2.47 GHz) (see FIG. 33(b)), and it was revealed that the actual gain was not sufficient with this metallic cover.

The metallic cover provided with an IC tag and the metallic container of the present invention are explained hereinabove with reference to preferred embodiments. The metallic cover provided with an IC tag and the metallic container are not restricted to the above-mentioned embodiments, and it is needless to say various modifications are possible within the range of the present invention.

For example, in the above-mentioned embodiment, although an explanation was made taking as an example a metallic can container with which drinks or the like are filled, as the metallic container to which the present invention can be applied, the use of the container, contents to be accommodated, constituent components of the container or the like are not specifically restricted. That is, as long as it is a container which is provided with a metallic cover or the like which is electrically connected with an IC chip and can function as an antenna, the size, shape, material or the like of a container may be arbitral. In addition, any content may be filled in the container.

INDUSTRIAL APPLICABILITY

The present invention can be preferably used as a metallic cover provided with an IC tag which is suitable for use in a metallic container such as an aluminum can, a steel can or the like, which is sealed by a metallic cover, which is in particular used as a container for drinks or the like.

The invention claimed is:

1. A metallic cover provided with an IC tag which is a metallic cover having a pull-tab, comprising:
   an IC chip for an IC tag to be mounted on said tab;
   an antenna for an IC tag; and
   a matching circuit for matching impedance between said antenna and said IC chip,
   wherein the matching circuit is set as a relationship between a real number part component {Re(Zma)} of an impedance (Zma) of said matching circuit, a real number part component {Re(Zic)} of an impedance (Zic) of the IC chip and a real number part component {Re(Zan)} of an impedance (Zan) of said tab is set to a relationship shown by the following formula (4) and a relationship between an imaginary number part component {Im(Zma)} of the impedance (Zma) of said matching circuit, an imaginary number part component {Im(Zic)} of the impedance (Zic) of the IC chip and an imaginary number part component {Im(Zan)} of the impedance (Zan) of said tab is set to a relationship shown by the following formula (5):

$$Re(Zma)=Re(Zic)-Re(Zan) \quad \text{Formula (4)}$$

$$Im(Zma)=-Im(Zic)-Im(Zan). \quad \text{Formula (5)}$$

2. The metallic cover provided with an IC tag according to claim 1, further comprising a base material on which the IC chip is mounted and, on said base material, a circuit pattern as the matching circuit formed of a conductive metal.

3. The metallic cover provided with an IC tag according to claim 1, wherein said tab functions as said antenna by allowing said IC chip to electrically contact said tab.

4. The metallic cover provided with an IC tag according to claim 3, wherein said tab is formed in a predetermined shape such that it has impedance with which a predetermined actual gain as the antenna for an IC tag can be obtained.

5. The metallic cover provided with an IC tag according to claim 1, wherein said metallic cover is provided with a cover panel to which said tab is fixed, and said tab is formed in a shape that a space into which fingers can be inserted is formed between a front end edge of said tab and an inner diameter of said cover panel.

6. The metallic cover provided with an IC tag according to claim 5, wherein said tab electrically contacts said cover panel, and said tab and said cover panel function as the antenna for the tab.

7. The metallic cover provided with an IC tag according to claim 5, wherein said cover panel is provided with one or two or more projections which protrude towards said tab and contact said tab.

8. A metallic container provided with a container main body and a metallic cover to be put on said container main body, wherein said metallic cover comprises the metallic cover according to claim 1.

9. A metallic cover having a pull-tab which comprises an IC chip for an IC tag which is mounted on said tab and electrically contacts said tab,
wherein said tab is formed into a predetermined shape such that it has impedance with which a predetermined actual gain as the antenna can be obtained, and
the tab is formed as a relationship between a real number part component {Re(Zan)} of an impedance (Zan) of said tab and a real number part component {Re(Zic)} of an impedance (Zic) of said IC chip satisfy a following formula (1) and a relationship between an imaginary number part component {Im(Zan)} of the impedance (Zan) of said tab and an imaginary number part component {Im(Zic)} of the impedance (Zic) of said IC chip satisfies a following formula (2):

$$Re(Zan)=Re(Zic) \quad \text{Formula (1)}$$

$$Im(Zan)=-Im(Zic). \quad \text{Formula (2)}$$

10. The metallic cover provided with an IC tag according to claim 9, wherein said tab is formed in a predetermined shape with which the imaginary number part component {Im(Zan)} of the impedance (Zan) of said tab satisfies a following formula (3) in a communication frequency band of the IC tag to be applied $$0<\{Im(Zan)\}. \quad \text{Formula (3)}$$

11. The metallic cover provided with an IC tag according to claim 10, wherein said tab is provided with a ring part and said tab is formed such that a circumferential length L of said ring part is 28 mm≤L.

12. The metallic cover provided with an IC tag according to claim 9, further comprising a cover panel to which said tab is fixed,
wherein said tab electrically contacts said cover panel to allow said tab and said cover panel to function as the antenna, and said cover panel is provided with one or two or more projections which protrude towards said tab and contact said tab.

13. The metallic cover provided with an IC tag according to claim 12, wherein said tab is formed into a shape such that a space into which fingers can be inserted is formed between a front end edge of said tab and an inner diameter of said cover panel.

14. The metallic cover provided with an IC tag according to claim 9, which further comprises, between said tab and said IC chip, a matching circuit for matching impedances of said tab and said IC chip.

15. A metallic container provided with a container main body and a metallic cover to be put on said container main body, wherein said metallic cover comprises the metallic cover according to claim 9.

\* \* \* \* \*